United States Patent
Kapoor et al.

(10) Patent No.: US 7,173,215 B1
(45) Date of Patent: Feb. 6, 2007

(54) METHOD FOR EVALUATING AND/OR COMPARING WELDING CONSUMABLES

(75) Inventors: Ashish Kapoor, Highland Heights, OH (US); Teresa A. Melfi, Kirtland, OH (US); Janet M. Morse, Perry Township, OH (US); Jon P. Chiappone, Willoughby, OH (US)

(73) Assignee: Lincoln Global, Inc., City of Industry, CA (US)

( * ) Notice: Subject to any disclaimer, the term of this patent is extended or adjusted under 35 U.S.C. 154(b) by 14 days.

(21) Appl. No.: 11/180,321

(22) Filed: Jul. 13, 2005

(51) Int. Cl.
   *B23K 9/095* (2006.01)
   *B23K 9/18* (2006.01)
(52) U.S. Cl. .................. 219/137 R; 219/130.01; 219/73
(58) Field of Classification Search ........... 219/130.01, 219/137 R, 73; 228/103
   See application file for complete search history.

(56) References Cited

U.S. PATENT DOCUMENTS 5,004,884 A * 4/1991 Sakaguchi et al. ............ 219/73

\* cited by examiner

*Primary Examiner*—Kevin P. Kerns
(74) *Attorney, Agent, or Firm*—Fay, Sharpe, Fagan, Minnich & McKee, LLP

(57) ABSTRACT

Methods and systems are disclosed for characterizing a welding consumable, such as flux or an electrode, and/or for comparing two or more welding consumables for use in narrow gap deep groove welding operations, including creating test welds on fixtures having joint grooves of various angles for a given groove depth, followed by controlled standardized non-aggressive slag removal operations, and quantification of the amount of slag remaining in the groove, wherein the welding consumables are each characterized using the same fixtures, welding conditions, workpiece groove depths, groove angles, and removal operations, to construct a set of results, such as a table or rating, by which the individual welding consumables can be rated and/or a determination can be made as to which of two consumables provides superior performance with respect to ease of removal in deep groove welding operations.

57 Claims, 20 Drawing Sheets

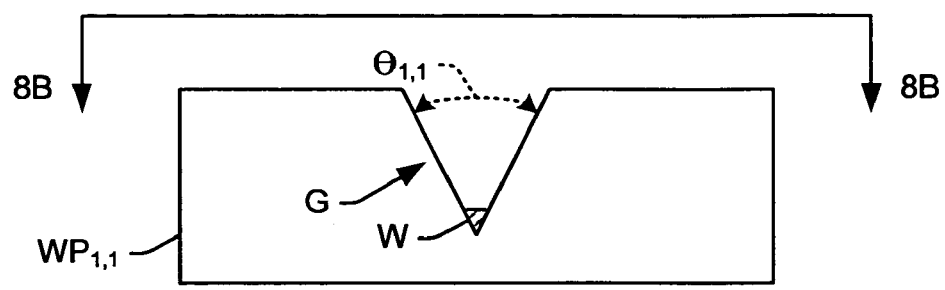
FIG. 8A
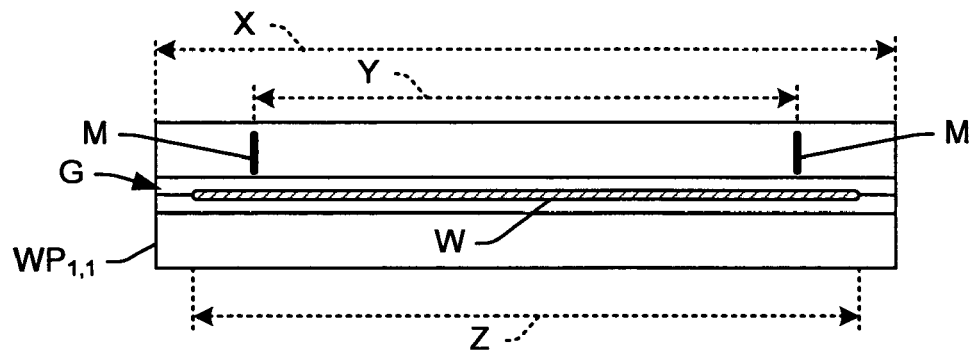
FIG. 8B
| ANGLE | FLUX 1 | FLUX 2 |
|---|---|---|
| $\Theta_{1,1} = \Theta_{1,2}$ | REMOVED | |
| $\Theta_{2,1} = \Theta_{2,2}$ | | |
| $\Theta_{3,1} = \Theta_{3,2}$ | | |
| ⋮ | | |
| $\Theta_{N-2,1} = \Theta_{M-2,2}$ | | |
| $\Theta_{N-1,1} = \Theta_{M-1,2}$ | | |
| $\Theta_{N,1} = \Theta_{M,2}$ | | |
FIG. 9

96 →
| ANGLE | FLUX 1 | FLUX 2 |
|---|---|---|
| $\Theta_{1,1} = \Theta_{1,2}$ | REMOVED | |
| $\Theta_{2,1} = \Theta_{2,2}$ | REMOVED | |
| $\Theta_{3,1} = \Theta_{3,2}$ | | |
| ⋮ | | |
| $\Theta_{N-2,1} = \Theta_{M-2,2}$ | | |
| $\Theta_{N-1,1} = \Theta_{M-1,2}$ | | |
| $\Theta_{N,1} = \Theta_{M,2}$ | | |
FIG. 15
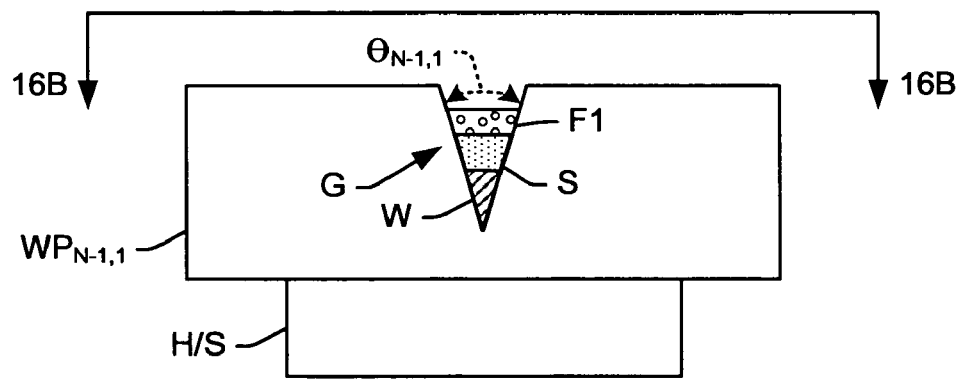
FIG. 16A
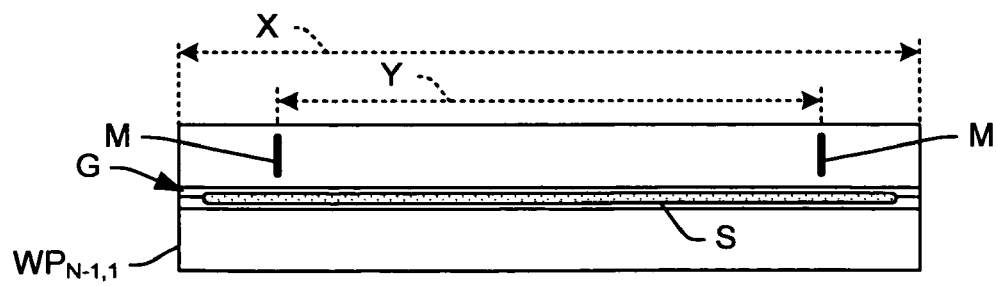
FIG. 16B

| ANGLE | FLUX 1 | FLUX 2 |
|---|---|---|
| $\Theta_{1,1} = \Theta_{1,2}$ | REMOVED | |
| $\Theta_{2,1} = \Theta_{2,2}$ | REMOVED | |
| $\Theta_{3,1} = \Theta_{3,2}$ | REMOVED | |
| | | |
| $\Theta_{N-2,1} = \Theta_{M-2,2}$ | REMOVED | |
| $\Theta_{N-1,1} = \Theta_{M-1,2}$ | *NOT REMOVED* | |
| $\Theta_{N,1} = \Theta_{M,2}$ | (NOT REMOVED) | |
$\Theta_{i,1MIN}$ →
96
FIG. 19
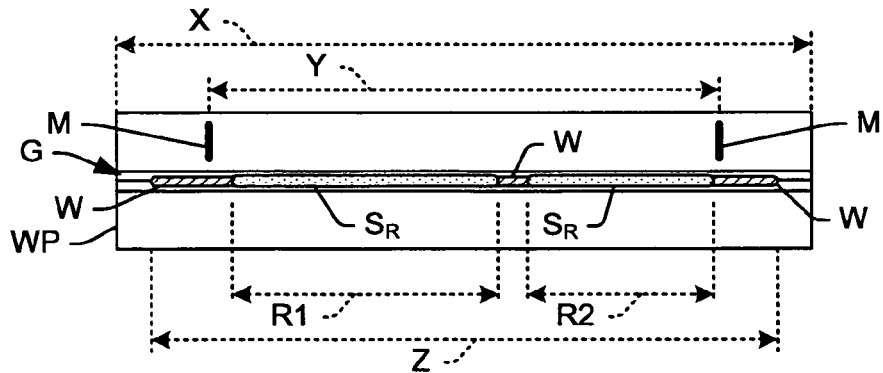
FIG. 20
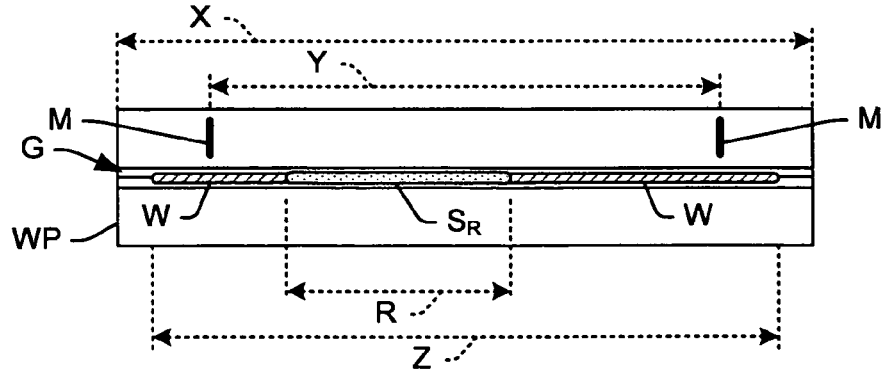
FIG. 21

96 →
| ANGLE | FLUX 1 | FLUX 2 |
|---|---|---|
| $\theta_{1,1} = \theta_{1,2}$ | REMOVED | REMOVED |
| $\theta_{2,1} = \theta_{2,2}$ | REMOVED | |
| $\theta_{3,1} = \theta_{3,2}$ | REMOVED | |
| | | |
| $\theta_{i,1MIN} \rightarrow$ $\theta_{N-2,1} = \theta_{M-2,2}$ | REMOVED | |
| $\theta_{N-1,1} = \theta_{M-1,2}$ | *NOT REMOVED* | |
| $\theta_{N,1} = \theta_{M,2}$ | (NOT REMOVED) | |
FIG. 28
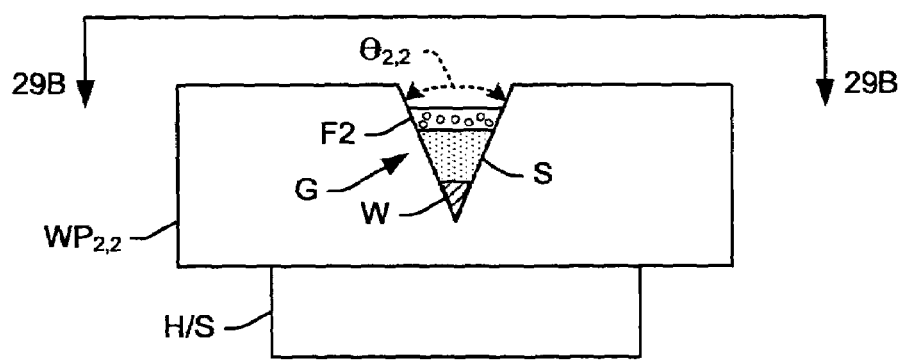
FIG. 29A
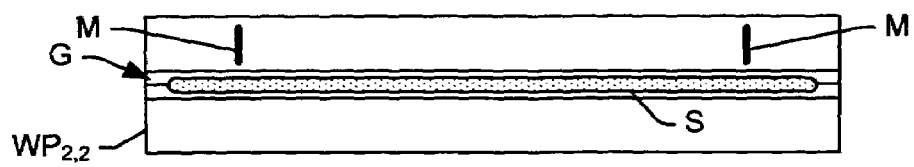
FIG. 29B

96 ─▶

| ANGLE | FLUX 1 | FLUX 2 |
|---|---|---|
| $\Theta_{j,2MIN}$ → $\Theta_{1,1} = \Theta_{1,2}$ | REMOVED | REMOVED |
| $\Theta_{2,1} = \Theta_{2,2}$ | REMOVED | *NOT REMOVED* |
| $\Theta_{3,1} = \Theta_{3,2}$ | REMOVED | (NOT REMOVED) |
| ⋮ | | |
| $\Theta_{i,1MIN}$ → $\Theta_{N-2,1} = \Theta_{M-2,2}$ | REMOVED | (NOT REMOVED) |
| $\Theta_{N-1,1} = \Theta_{M-1,2}$ | *NOT REMOVED* | (NOT REMOVED) |
| $\Theta_{N,1} = \Theta_{M,2}$ | (NOT REMOVED) | (NOT REMOVED) |

| ANGLE Θ (DEGREES) | MEASURED LENGTH R OF REMAINING SLAG FOR FLUX 1 (INCHES) | MEASURED LENGTH R OF REMAINING SLAG FOR FLUX 2 (INCHES) |
|---|---|---|
| $\Theta_{j,2MIN}$ → 120 | 0" | 4" |
| 110 | 0" | 10" |
| 100 | 0" | 10" |
| 90 | 0" | 10" |
| 80 | 0" | 10" |
| 70 | 0" | 10" |
| $\Theta_{i,1MIN}$ → 60 | 3" | 10" |
| 50 | *10"* | 10" |

FIG. 34

METHOD FOR EVALUATING AND/OR COMPARING WELDING CONSUMABLES

FIELD OF THE INVENTION

The present invention relates generally to arc welding technology, and more particularly to methods for evaluating and/or comparing welding consumables for deep groove and other slag-producing arc welding applications.

BACKGROUND OF THE INVENTION

Fluxes are applied to weld joints in several forms to create slag that protects the molten weld metal from ambient conditions as the weld cools. In general, the welding flux solidifies after the weld to form a protective slag over on top of the weld. Once the weld cools, the slag is chipped off or otherwise removed. Several common methods of providing flux to a welding operation exist. One technique involves performing the weld within a pile of granular flux (e.g., submerged arc welding (SAW) processes). Another common type of arc welding operation is shielded metal arc welding (SMAW) (e.g., also known as stick welding or manual metal arc welding), in which the solid welding electrode is coated with a flux material that forms the protective slag. Gas metal arc welding (GMAW) or metal inert gas (MIG) welding involves the use of shielding gas commonly provided from an external source to protect the weld process including the arc and the weld metal from ambient effects such as oxidation and/or nitridation, wherein the flux may be provided in the interior of a cored electrode structure (e.g., flux cored arc welding or FCAW), or the electrode may be coated with flux material. In welding operations generally, the slag is removed following creation of the weld joint, wherein it is desirable to provide welding flux that produces slag which is easily removed without damage to the weld joint or to the workpiece.

In the case of submerged arc welding, a bare welding electrode is fed into a workpiece weld groove, where the point of metal fusion and the arc are submerged within a separate flux in order to shield the arc from the ambient environment of the welding operation. The molten weld pool and the arc zone are thus protected from atmospheric contamination by being submerged in the flux. Submerged arc welding has many advantages, including high deposition rates, deep weld penetration, high weld quality, and high lineal welding speeds for thin sheet steel workpieces with minimal welding fume or arc light emission. Submerged arc welding typically uses a relatively large diameter electrode that is fed through the pile of granular flux and into the arc at a controlled rate. The arc is shielded by a granular flux which is poured to form a pile in and sometimes over a weld groove of the workpiece being welded so as to surround the arc. Submerged arc welding is often used for high quality applications, such as welding deep groove joints, wherein multiple welding passes are performed to join two workpiece edges together. For deep groove welding, several weld passes are performed, with an initial pass being formed at the bottom of the joint groove, followed by one or more subsequent welds to join the workpiece edges, eventually filling the groove with metal.

In each pass, the welding flux or gas operates to prevent oxygen or other ambient impurities from reacting with the weld metal (e.g., oxidation), and some of the molten flux is converted to slag by the arc. The slag then solidifies and helps to protect the weld as it cools. Although the slag is a helpful byproduct of SAW processes for protection during weld cooling, the slag must be removed before beginning the next pass in a multiple pass welding process to maintain high weld quality. The same is true of FCAW, SMAW, and GMAW processes generally, wherein the ability to easily remove remnant slag following a welding operation is a desirable performance characteristic for welding flux, regardless of the way in which the flux is provided to the process. If any slag remains in the weld groove when a new pass begins, slag inclusions may result, which are elongated or globular pockets of metallic oxides, electrode coating materials, resolidified flux and/or other solid compounds within a cooled weld joint that may be subject to fracturing or cracking over time or may otherwise degrade the quality of the finished weld joint. In multilayer welding operations, such slag inclusions can be avoided or mitigated by preparing the groove and weld properly before each bead or new pass is deposited, removing all slag before beginning a new pass by chipping, chiseling, and/or other cleaning operations, and by ensuring that the slag rises to the surface of the weld pool during each welding pass by avoiding low lineal travel speeds and low currents.

In deep groove welding operations, moreover, it is generally desirable to minimize the joint groove angle, so as to conserve welding consumables and to minimize welding times. However, as the groove angle decreases for a given groove depth (e.g., narrow gap deep groove multi-pass welding operations), cleaning the excess slag and ensuring that the molten flux rises to the top of the weld puddle is increasingly difficult, particularly for the initial or root pass at the bottom of the joint groove. In this regard, different granular fluxes perform differently with respect to ease of removal from narrow workpiece grooves, and welding system operators need to know which flux to employ in a given operation. Accordingly, there is a need for techniques by which welding consumables, including granular fluxes for SAW applications and fluxes provided within or on an outer surface of welding electrodes in other types of welding processes can be analyzed and compared for deciding which consumable to use in a given narrow gap deep groove welding operation.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention relates to welding consumable rating and ranking systems and methods, and to comparative analysis of two or more welding consumables by creating test welds on fixtures having joint grooves of various angles for a given groove depth, followed by controlled non-aggressive slag removal operations, along with quantification of the amount of slag remaining in the groove, wherein the consumables are each characterized using the same fixtures, welding conditions, workpiece groove depths, groove angles, and removal operations, to construct a set of results, such as a table or rating, by which a determination can be made as to the quality of a given flux-providing welding consumable or as to the relative quality of two or more such consumables with respect to ease of slag removal in deep groove SAW, SMAW, GMAW, FCAW or other slag-producing welding operations.

One aspect of the invention provides a method for rating a welding consumable, such as granular SAW flux, welding electrodes having flux materials therein or thereon, or other consumable welding product that provides flux to a welding process, in which a set of substantially identical workpieces is provided that individually include a groove with a corresponding groove angle formed therein, where the workpieces in the set have successively smaller groove angles. The method also includes performing a welding operation to create a weld in each workpiece groove using the flux-providing consumable, and then performing a standardized non-aggressive slag removal operation on the workpieces. The amount of remnant or remaining slag is then measured for each workpiece, a minimum groove angle is determined for which the amount of remaining slag is less than a threshold amount, and the welding consumable can then be rated based on the minimum groove angle. The rating techniques of the present invention may be used in evaluating consumables with respect to all types of slag-producing welding processes, and further may be employed in characterizing ease of slag removal at different welding positions. For example, the process may be repeated for two different welding positions, with corresponding slag removal ratings being derived for a consumable at each position. In this regard, certain consumables may be designed specifically for certain welding positions (e.g., granular SAW flux designed primarily for 1 G position welding, or flux-providing weld electrodes designed for 2G L-groove fillet welding, etc.), wherein a given consumable may thus be rated for a number of different welding operations, for a number of different positions, for a number of different shielding gas arrangements, etc.

In another aspect of the present invention, a method is provided for comparing ease of slag removal of two or more welding consumables for use in arc welding operations. The method includes provision of first and second sets of workpieces, with each set including a plurality of substantially identical workpieces having a groove with a corresponding groove angle formed therein, where the workpieces of each set have successively smaller groove angles with a first workpiece of each set having the largest groove angle and a last workpiece having the smallest groove angle in a corresponding angular range. A welding operation is performed to create a weld in the groove of each workpiece using a first consumable (e.g. flux or electrode) for workpieces of the first set and using a second consumable for workpieces of the second set. Thereafter, a standardized non-aggressive slag removal operation is performed on the workpieces of both the sets, and the amount of remaining slag is measured for each workpiece. Minimum groove angles are then determined for each set based on the measured amounts of remaining slag, where the first minimum groove angle for the first set (e.g., corresponding to the first consumable) is the smallest groove angle from the first set for which the amount of remaining slag is less than a threshold amount, and the second minimum groove angle is the smallest groove angle in the second set for which the amount of remaining slag is less than the threshold amount. The method further includes ranking the consumables according to the minimum groove angles, by which an objective comparison of two or more such welding consumables can be achieved with respect to ease of removal.

According to still another aspect of the invention, a system is provided for rating a welding consumable. The system comprises a set of substantially identical workpieces with grooves of successively smaller groove angles, as well as a welding system for performing a welding operation to create a weld in the workpiece grooves using the consumable. A removal system is provided for performing a standardized non-aggressive slag removal operation on the workpieces after the welding operation, and the system further includes means for measuring an amount of remaining slag for each the workpiece after performing the standardized non-aggressive slag removal operation, means for determining a minimum groove angle for which the amount of remaining slag is less than a threshold amount, and means for rating the welding consumable according to the minimum groove angle.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which:

FIGS. 8A and 8B are end elevation and top plan views illustrating the test workpiece of FIG. 7 in the original upright position, wherein essentially all the slag has been removed by gravity for the first flux and the first angle $\theta_1$;

FIG. 9 is a table or chart illustrating welding consumable analysis and comparison results for exemplary first and second granular fluxes at various groove angles, with an entry for the first flux indicating slag "removed" for the first groove angle $\theta_1$;

FIG. 15 shows the chart of FIG. 9 with another entry for the first flux indicating slag "removed" for the second angle $\theta_2$;

FIGS. 16A and 16B are end elevation and top plan views illustrating yet another test workpiece after several further iterations of analysis for the first flux with a still smaller groove angle $\theta_{N-1}$ after a welding operation using the first flux;

FIG. 19 shows the chart of FIGS. 9 and 15 with further entries for the first flux consumable indicating slag "removed" for the groove angles $\theta_1$ through $\theta_{N-2}$, and "not removed" for angles smaller than $\theta_{N-2}$;

FIG. 20 is a top plan view illustrating another test workpiece in which discontinuous slag portions remain over a test weld having a total length R greater than a threshold length following an unassisted gravitational removal operation;

FIG. 21 is a top plan view illustrating still another test workpiece in which a slag portion remains over a test weld having a total length R less than the threshold length following unassisted slag removal;

FIG. 28 shows the chart of FIGS. 9, 15 and 19 with entries for the first flux, consumable and an entry for the second flux indicating slag "removed" for the groove angle $\theta_1$;

FIGS. 29A and 29B are end elevation and top plan views illustrating another test workpiece with a V-shaped deep groove of angle $\theta_2$ similar to that of FIGS. 10A and 10B above, shown after a welding operation using the second flux, wherein a test weld is formed at the bottom of the groove beneath slag;

FIG. 33 shows the chart of FIGS. 9, 15, 19, and 28 with entries for the first and second granular SAW flux welding consumables, including an entry for the second flux indicating slag "removed" for the groove angle $\theta_1$ and "not removed" for the angle $\theta_2$, wherein the results in the table of FIG. 33 illustrate an objective comparative analysis of the two fluxes with the first flux being superior to the second flux with respect to ease of removal in submerged arc welding processes for narrow gap deep groove joints;

FIG. 34 illustrates an alternative table showing the measured lengths of remaining slag in the test workpieces having various groove angles for the first and second flux consumables, again showing the superior performance of the first flux with regard to ease of removal;

DETAILED DESCRIPTION OF THE INVENTION

Figure 1:
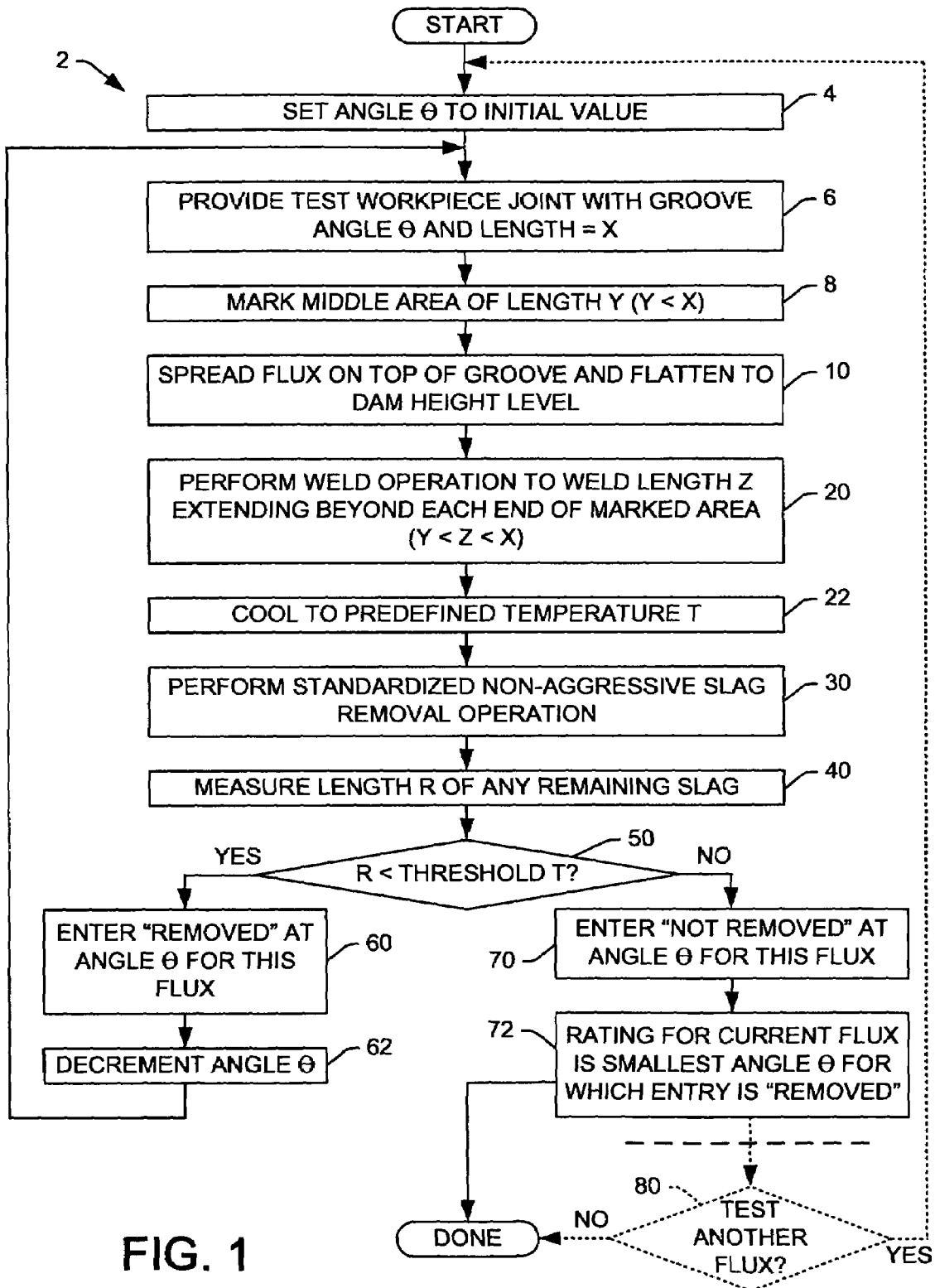
FIG. 1 is a simplified flow diagram illustrating an exemplary method for rating a welding consumable and alternatively for analyzing and comparing two or more welding consumable in accordance with one or more aspects of the invention.

One or more embodiments or implementations of the present invention are hereinafter described in conjunction with the drawings, wherein like reference numerals are used to refer to like elements throughout and wherein the illustrated structures are not necessarily drawn to scale. The invention relates to analyzing and comparing welding flux removability using objective welding and slag removal operations on similarly sized test workpieces with joint grooves of varying angles, thereby allowing individual welding consumable ratings and/or informed selection of the best welding consumable for a given welding application. The invention may be employed for analysis and comparison of any type of welding consumables that provide flux to, and produce slag in, a welding operation (e.g., granular fluxes, flux cored or coated electrodes, etc.) for any given welding operation (e.g., FCAW, SMAW, SAW, GMAW, etc.), at any welding position (e.g., SAW operations at 1G position, FCAW or SMAW operations at 2G position, etc.).

The invention is illustrated hereinafter and finds particular utility in association with highly basic granular fluxes used in narrow gap deep groove submerged arc welding operations. However, the invention is not limited to the illustrated examples, and in particular is not limited to deep groove applications, SAW processes, granular fluxes, or any specifics of the illustrated embodiments, wherein variations from the illustrated processes and techniques are contemplated as falling within the scope of the present invention and the appended claims.

Referring initially to FIG. 1, an exemplary method 2 is illustrated for characterizing or rating a granular submerged arc welding flux in accordance with the invention. The method 2 may optionally be employed for comparing two or more welding fluxes or other welding consumables with respect to ease of slag removal. While the exemplary process or method 2 and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Moreover, the methods of the invention may be carried out in conjunction with various fluxes, systems, and workpieces illustrated and described herein, as well as in association with other structures that are not illustrated or specifically discussed.

The illustrated method 2 may be used for quantifying the performance of a given flux-providing consumable or for characterizing relative removal performance of any two or more such consumables that produce slag in a welding process, wherein tests are undertaken to ascertain the smallest weld joint groove angle for which the slag can be easily and repeatably removed using standardized non-aggressive removal operations. This rating or relative ranking of the ease with which a given flux-generated slag can be acceptably removed advantageously facilitates narrowing of weld joint grooves so as to minimize welding electrode consumption and to improve lineal welding speeds for a given application, such as the deep groove submerged arc welding processes mentioned above. However, as discussed above, the invention may be used to characterize ease of slag removal with respect to any welding application to rate or rank any type of welding consumable. In this regard, the term welding consumable includes any consumable product that provides flux to, and/or generates slag in, a welding process. The exemplary method 2 of FIG. 1 is illustrated in flow diagram form in the context of submerged arc welding using granular flux consumables, wherein a first set of test workpieces having successively smaller groove angles are welded using a first flux and the flux removal is quantified or rated, wherein the rating process may optionally be repeated for a second set of workpieces and a second flux. It will be appreciated that the workpieces can be processed in any order to generate slag removal results from which an objective rating or comparative ranking can be made, wherein all such alternative implementations are contemplated as falling within the scope of the present invention and the appended claims. Furthermore, methods can be implemented in accordance with the invention for evaluating, rating, and ranking other welding consumables with respect to ease of slag removal for any type of welding process and any specific welding operation parameters, such as welding position or other conditions.

Figure 36:
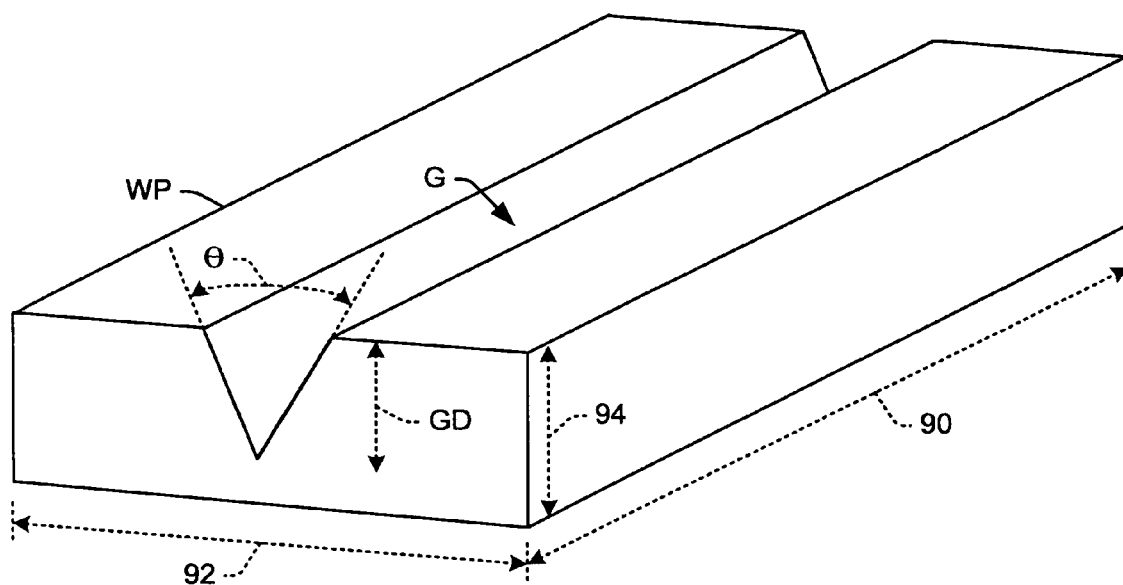
FIG. 36 is a perspective view illustrating an exemplary test workpiece of the type illustrated in the previous FIGURES, with a V-shaped groove for evaluating and comparing welding consumables.
Figure 37:
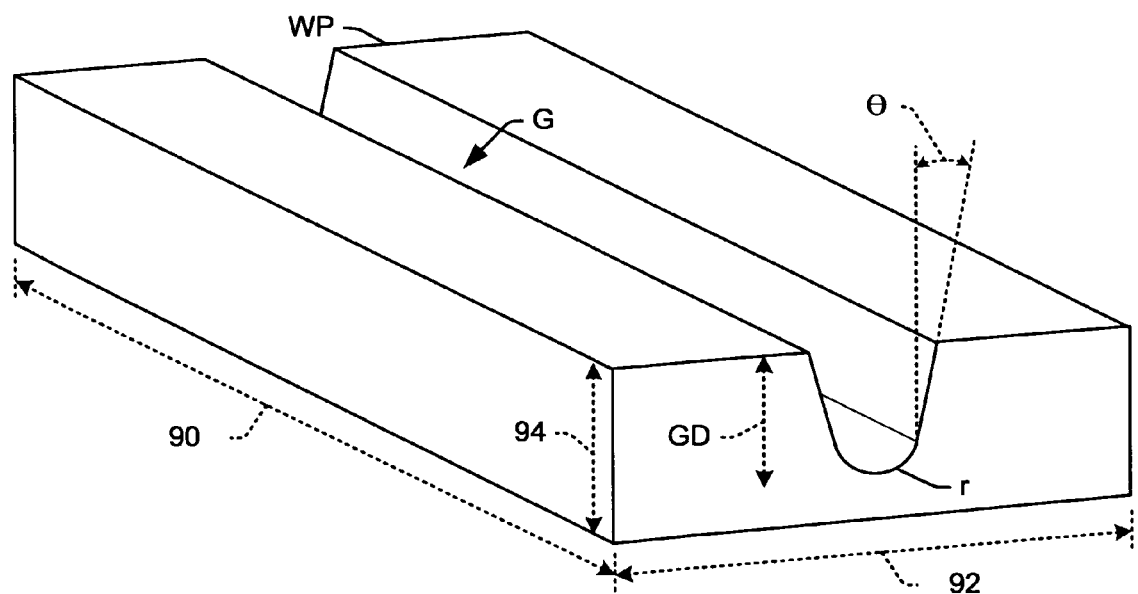
FIG. 37 is a perspective view illustrating another exemplary test workpiece having a U-shaped groove with a radius and a wall angle for evaluating and comparing welding fluxes in accordance with the invention.

Referring also to FIGS. 2A–34, 36, and 37, the operation of the exemplary method 2 is illustrated in conjunction with first and second sets of exemplary test workpieces WP welded using first and second granular fluxes F1 and F2 to construct a table 96 of flux removal results by which one or both of the individual fluxes F1 and F2 can be individually rated or from which a relative comparison thereof can be made with respect to ease of removal following submerged arc welding. As shown in FIGS. 2A–19, a first flux F1 is evaluated and a rating therefor is derived using a first set of N workpieces $WP_{i,1}$, where N is an integer number greater than 2 and i is a positive integer from 1 to N inclusive. As best shown in FIGS. 36 and 37, each workpiece $WP_{i,1}$ in the first set is generally rectangular with substantially identical length, width and height dimensions 90, 92, and 94, respectively, where the workpieces $WP_{i,1}$ each have a groove G with a corresponding groove angle $\theta_{i,1}$ formed therein in a first angular range. FIG. 36 illustrates such a workpiece WP with a V-shaped groove G extending along the length 90 to a groove depth GD, where the groove angle θ is the included angle between the two groove sidewalls. Other groove profiles may be used within the scope of the invention, where the groove can be characterized according to an angle θ of some sort. For example, FIG. 37 illustrates another exemplary test workpiece WP that may be employed in the methods and systems of the invention, in which a U-shaped groove G is formed to a depth GD, where the groove profile or shape includes a radius r and a sidewall angle θ. In narrow gap deep groove welding applications, the invention is particularly useful in characterizing fluxes for welding grooves of depths GD of about 0.75 inches or more, as shown in the exemplary workpieces WP of FIGS. 2A–32B, 36 and 37.

In accordance with a preferred implementation of the invention, the first and second sets of workpieces WP are of similar materials, dimensions 90, 92, 94, wherein the workpieces WP of each set have successively smaller groove angles $\theta_i$ with a first workpiece $WP_1$ of each set having the largest angle in the set and a last workpiece $WP_N$ having the smallest angle. In the illustrated example, moreover, the angular ranges of the two workpiece sets are the same, although this is not a requirement of the invention. The first set of workpieces $WP_{1,1}$ through $WP_{N,1}$ in the example of FIGS. 2A–19 have a groove G with a corresponding groove angle $\theta_{i,1}$ in a first angular range from $\theta_{1,1}$ through $\theta_{N,1}$ with the workpieces $WP_{i,1}$ having successively smaller groove angles $\theta_{i,1}$ with the first groove angle $\theta_{1,1}$ being the largest angle and the Nth groove angle $\theta_{N,1}$ being the smallest angle in the first angular range. In this example, moreover, the second set used to test the second flux F2 (FIGS. 22A–32B below) includes M workpieces $WP_{j,2}$ where j ranges from 1 through M with the same groove angles θ as in the first set, wherein N=M and $θ_{i,1}=θ_{j,2}$.

Figure 2A:
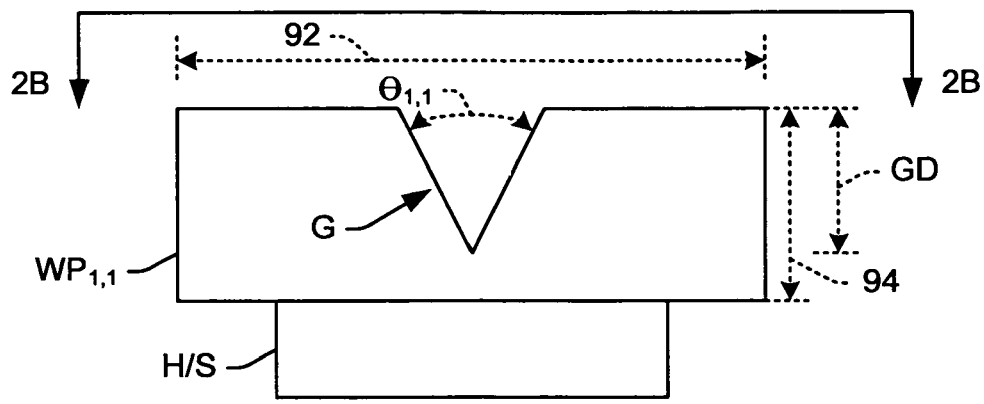
FIGS. 2A and 2B are end elevation and top plan views illustrating an exemplary first test workpiece mounted on a heat sinking test fixture and having a V-shaped narrow gap deep groove of a first groove angle $\theta_1$ formed therein for evaluating welding consumable performance with respect to ease of slag removal.
Figure 2B:
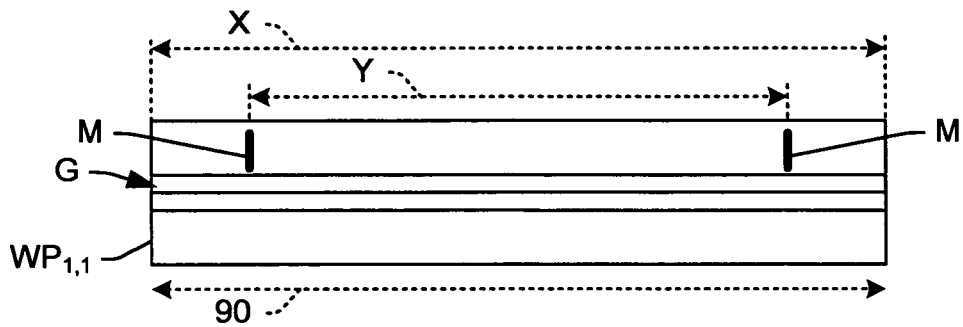

As shown in FIGS. 2A and 2B, a first workpiece $WP_{1,1}$ of the first set is illustrated with a V-shaped groove G of groove length X extending essentially along the entire length 90 of the workpiece $WP_{1,1}$ to a depth GD of about 0.75 inches, wherein the workpiece length 90 and the groove length X are approximately 14 inches long, the workpiece width 92 is approximately 3 inches, and the thickness or height 94 is about 1 inch. These general dimensions are not critical to the invention, but rather, the similarity between dimensions of different workpieces is desirable to insure the objectivity of the resulting analysis and ranking among the fluxes being tested. As shown in FIG. 2A, moreover, the first workpiece $WP_{1,1}$ of the first set is located in contact with a heat sinking mounting fixture H/S, which ideally provides uniform heat removal or sinking for the portion of the workpiece $WP_{1,1}$ proximate the joint groove G. For example, a copper cooled plate may be used for the fixture H/S in one example.

Beginning at 4 in FIG. 1, the method 2 includes setting the initial groove angle θ at 4 (in this case, the groove angle $θ_{1,1}$), and the corresponding first workpiece $WP_{1,1}$ of FIGS. 2A and 2B is provided at 6 in the method 2. In general, the first angular range will include large enough groove angles θ for which satisfactory removal is expected for a given flux and groove depth GD, with successively smaller angles θ to ascertain the angle at which removal becomes unacceptable, for example, when unassisted gravitational removal or other standardized non-aggressive removal techniques leave a length R of remaining slag which is longer than a certain percentage (e.g., 50% in one example) of the length Y of a marked middle area of the test weld W. In this regard, the angular range for the first set of workpieces $WP_{i,1}$ and the second angular range for the second set may be coextensive as in the illustrated examples, although this is not required. Furthermore, the first and second angular ranges may, but need not, overlap one another. In one example illustrated and described herein, the largest groove angle θ in each range is 120 degrees (e.g., $θ_{1,1}=θ_{1,2}=120°$) and the subsequent workpieces WP in each set have successively smaller groove angles θ in ten degree increments down to 50 degrees ($θ_{N,1}=θ_{N,2}=50°$). The workpieces may be tested in any order within the scope of the invention, wherein the workpiece $WP_{1,1}$ with the largest angle $θ_{1,1}$ (e.g., 120 degrees in one example) is initially provided at 6 in the exemplary method 2 of FIG. 1.

Figure 3A:
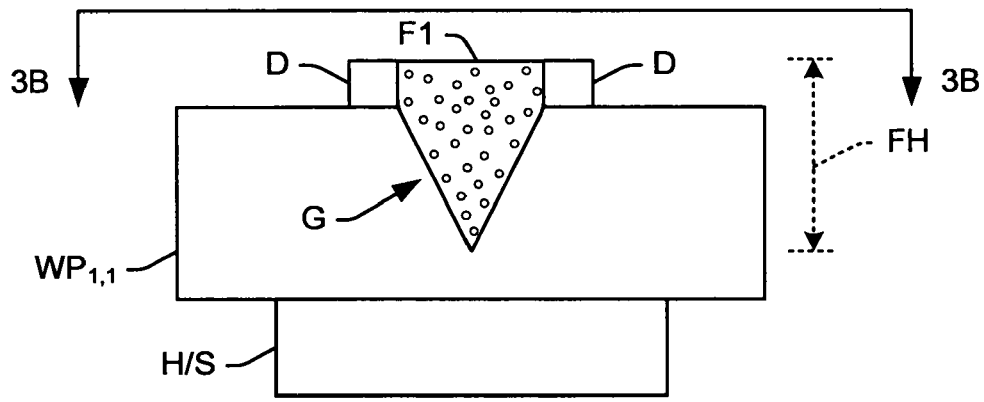
FIGS. 3A and 3B are end elevation and top plan views illustrating the test workpiece of FIGS. 2A and 2B with the groove filled with a first granular welding flux consumable to a test flux depth using dam structures.
Figure 3B:
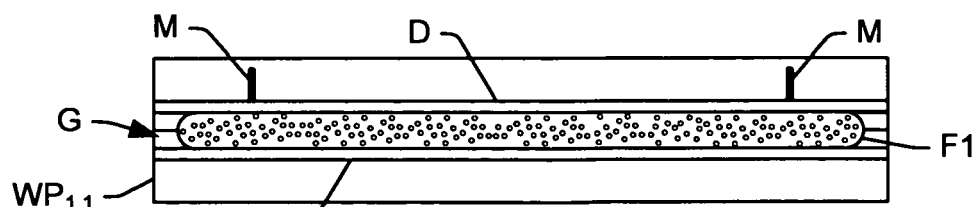

At 8, a middle area or portion is marked using physical markings M (FIG. 2B), where the marked middle area has a length Y (e.g., about 10 inches in the illustrated implementation) that is less than the total groove length X. The first flux F1 is then spread in and over the groove G at 10 and flattened to the height of dams D located at the top sides of the groove G to establish a uniform flux height FH as shown in FIGS. 3A and 3B, wherein the flux pile F1 extends beyond the marks M. The flux height FH may be established with or without the use of dams D, wherein the groove depth GD and the flux height FH are adjustable to correspond to a welding application for which the flux removal testing is being performed. In one example, a welding application of interest involves welding 1 inch plates with joint edges formed with a selected included angle, wherein the ultimate groove depth in the target application is 1 inch. In this situation, the test workpieces WP may be created from 1 inch plates of similar materials and dimensions (e.g., height 94=1 inch in FIG. 2A), with a groove depth GD of 0.75 inches at various test angles θ, wherein 0.25 inch dams D are used such that the flux pile has a thickness or height FH of 1 inch to correspond to the groove or joint depth of the welding application of interest.

Figure 4A:
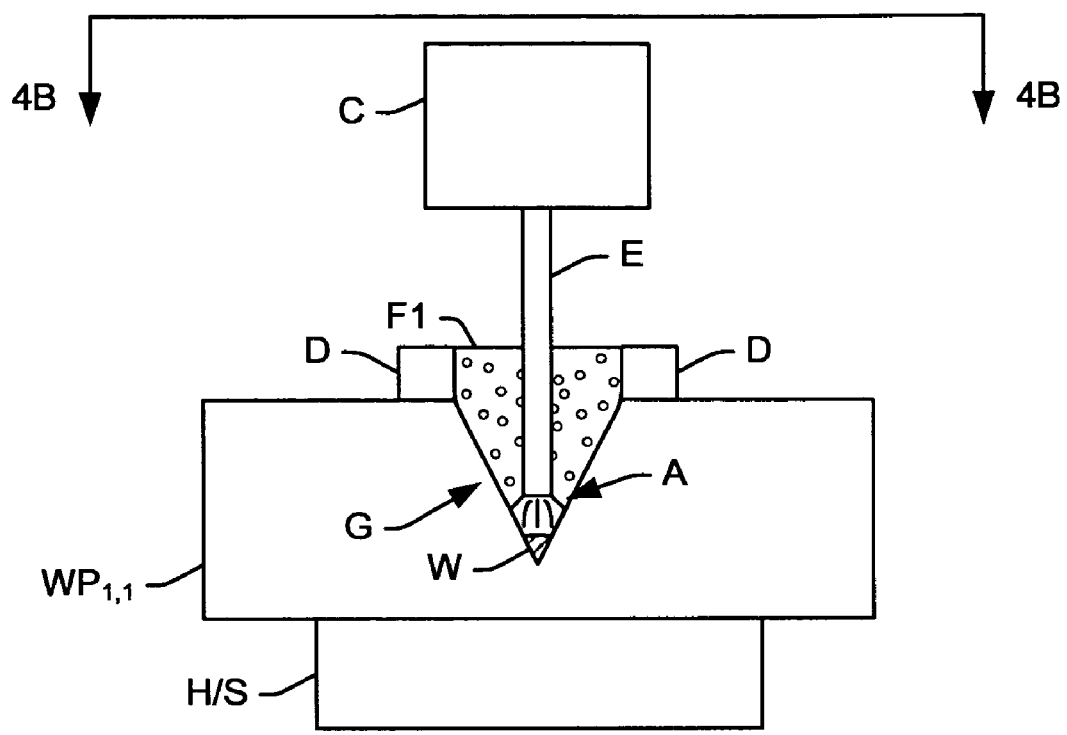
FIGS. 4A–4C are end elevation and top plan views illustrating the first test workpiece of FIGS. 3A and 3B undergoing an exemplary submerged arc weld operation to form a first pass test weld at the bottom of the groove, resulting in melting of the granular first flux consumable and formation of slag in the workpiece groove.
Figure 4B:
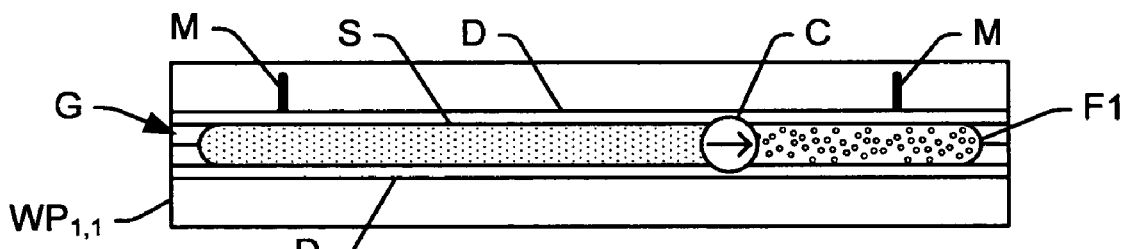
Figure 4C:
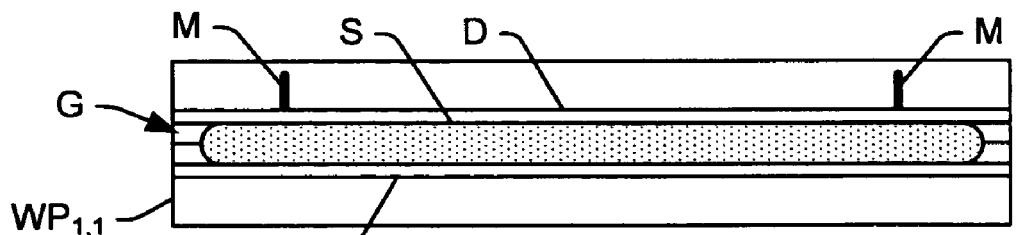

Referring also to FIGS. 4A–4C, a weld operation is then performed at 20 using welding materials, parameters, and settings commensurate with those of the welding application of interest to create a test weld W at the bottom of the flux filled groove G of weld length Z extending beyond each end marking M, wherein the weld distance Z is longer than the marked middle area length Y and shorter than the groove length X. FIG. 4A illustrates the test weld W being formed using submerged arc welding (SAW) with a consumable electrode E being directed toward the bottom of the groove G within the flux F1 with a fixed distance from the tip of a welder contact C to the workpiece $WP_{1,1}$ (contact to work distance or CTWD). The electrode E is energized to create a welding arc A between the electrode E and the workpiece $WP_{1,1}$ such that weld material W is deposited in the bottom of the groove G as the electrode E and contact C are translated along the length of the flux pile F1, wherein FIG. 4B shows the contact C at an intermediate point in the weld operation with slag S being formed after the welding electrode passes through the flux F1, and FIG. 4C shows the workpiece $WP_{1,1}$ after completing the weld W. The workpiece $WP_{1,1}$ is then allowed to cool to a predefined temperature T at 22.

A standardized non-aggressive slag removal operation is then undertaken at 30, which can be any repeatable process for removing all or a portion of the remaining slag S from the welded workpiece $WP_{1,1}$. The standardized non-aggressive removal operations of the present invention include any fixed, repeatable, operation that provides an amount of removal force to slag S remaining in a weld groove G following a welding operation by which the ease of removal of two different fluxes can be distinguished within an angular range of interest for a given welding operation and groove depth GD. In this regard, it will be appreciated that if overly aggressive material removal techniques were used, any and all remaining slag S would be removed from every workpiece, regardless of the flux used and regardless of the groove angle and size. Thus, suitable standardized non-aggressive slag removal techniques may include, for example, unassisted gravitational removal, wherein the workpiece WP is inverted without shaking the workpiece WP and without otherwise actively forcing material removal (e.g., without brushing, polishing, or otherwise contacting the slag S with external solids or liquids). In one alternative, a fixed or controllable amount of mechanical shaking or movement can be used, alone or in combination with gravitational or other forces. Another possible standardized non-aggressive removal technique is to use forced air or other pressurized gas (e.g., air jets) applied in a consistent, fixed, repeatable manner to the length of the weld groove G or the middle area thereof. Furthermore, two or more such standardized non-aggressive removal techniques may be employed in combination within the scope of the invention. In addition, the type of non-aggressive removal operation may be selected according to the welding operation type, groove depth, or other consideration, wherein different removal techniques can be used in rating and/or ranking fluxes with respect to different applications, with the same selected standardized non-aggressive removal operation being used throughout the process for a given application.

Figure 5A:
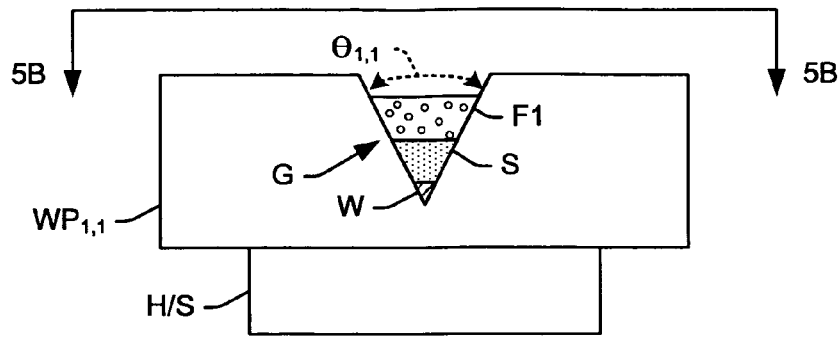
FIGS. 5A and 5B are end elevation and top plan views illustrating the test workpiece of FIGS. 4A–4C after the welding operation with the test weld at the bottom of the groove and slag overlying the weld in the workpiece groove.
Figure 5B:
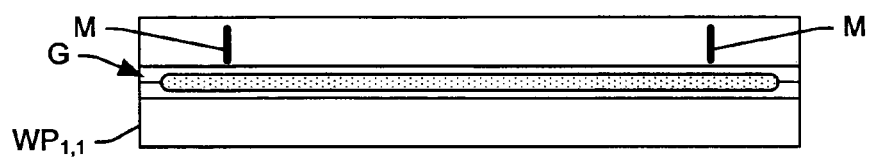
Figure 6:
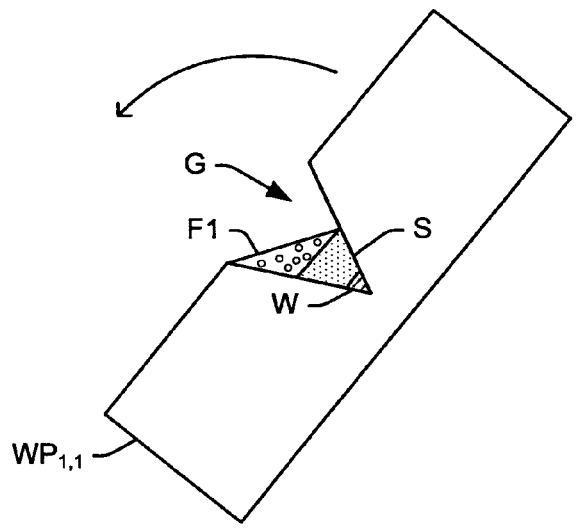
FIG. 6 is an end elevation view of the workpiece of FIGS. 5A and 5B removed from the heat sinking test fixture and being rotated or flipped over for unassisted slag removal.
Figure 7:
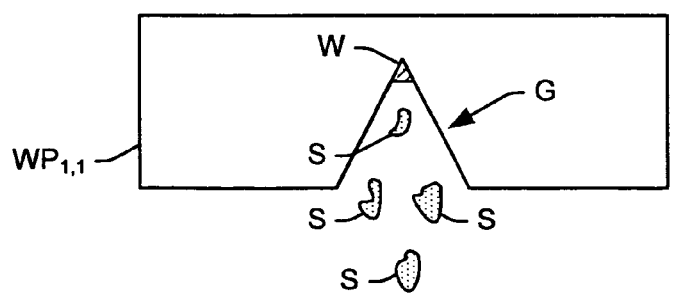
FIG. 7 is an end elevation view of the workpiece of FIG. 6 inverted for unassisted gravitational slag removal.

In the illustrated implementation, a standardized unassisted gravitational slag removal process is used at 30, as shown in FIGS. 5A–8B, although any suitable standardized non-aggressive removal operation may be used which can be repeated for each workpiece WP tested. FIGS. 5A and 5B show the first workpiece $WP_{1,1}$ of the first set following formation of the test weld and after a certain cooling time, wherein solidified slag S remains from the first flux F1 used in the test welding operation. As shown in FIGS. 6 and 7, the workpiece $WP_{1,1}$ is then flipped over or inverted to allow unassisted removal of all some or none of the slag S without chiseling or other physical assistance (e.g., without bumping or shaking the workpiece $WP_{1,1}$.

The workpiece $WP_{1,1}$ is then reinverted to the original upright position in FIGS. 8A and 8B, and a length R of any remaining slag S is measured at 40 within the middle area between the marks M. The measurement at 40 and a subsequent determination (e.g., threshold comparison) at 50 below may be performed manually using a ruler, tape measure, etc. or the rating system can be automated with optical components used to distinguish remaining slag S from the test weld W and to measure the total length R of any such remaining slag S (e.g., whether continuous or discontinuous) in the groove G. Such measurement and analysis means may also be adapted to determine the relative lengths of the remaining slag S and the distance Y of the middle area of the workpiece $WP_{1,1}$ using the marks M, whereby a determination can be made in an automated fashion as to whether the remaining slag length R is less than a given percentage of the distance Y (e.g., 50% in one example) in order to ascertain the proper table entry for the workpiece $WP_{1,1}$.

In the case of the large first groove angle $\theta_{1,1}$, there is no remaining slag (e.g., remaining slag length dimensions R=0) as shown in FIGS. 8A and 8B. A determination is then made at 50 in FIG. 1 as to whether the remaining slag length R is less than a threshold T, for example, 50% of the middle area length Y. This determination at 40 is then entered in a table 96 as shown in FIG. 9 in a location corresponding to the groove angle $\theta_{1,1}$ and the first flux F1. Alternative implementations are possible, for example, where the actual measured length R is entered into a table 98 as shown in FIG. 34 below (e.g., R=0 inches for the first workpiece $WP_{1,1}$ of the first set). In the example of FIGS. 1 and 9, the first workpiece $WP_{1,1}$ has a remaining slag length R which is less than 50% of the middle area distance Y (YES at 50), wherein the corresponding table entry is entered as "REMOVED" at 60 and the angle $\theta$ is decremented at 62, after which the method 2 returns to 6 to test the next workpiece of the first set ($WP_{2,1}$).

Figure 10A:
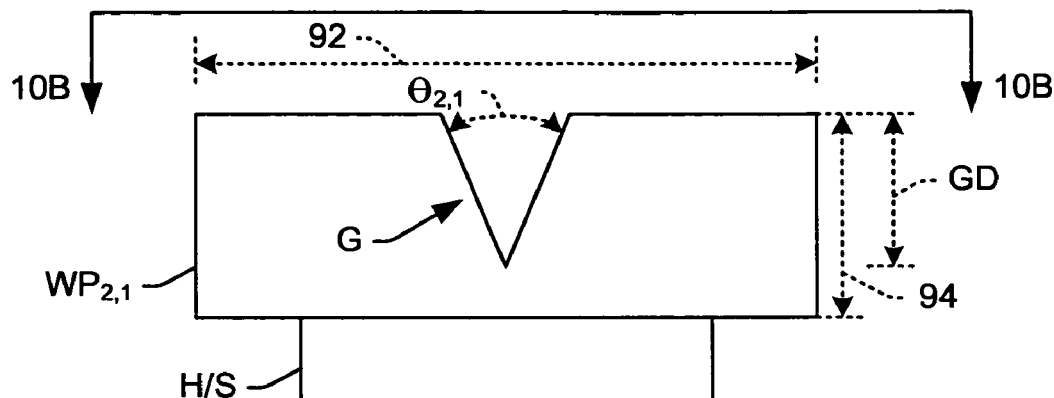
FIGS. 10A and 10B are end elevation and top plan views illustrating another test workpiece with a V-shaped deep groove of a smaller angle $\theta_2$ for further evaluating performance of the first flux.
Figure 10B:
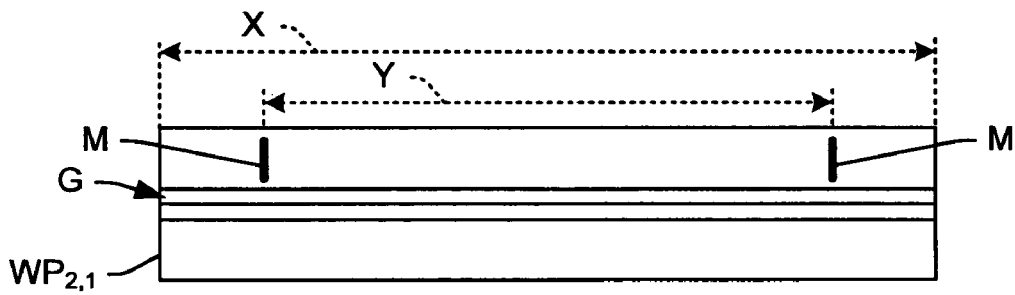
Figure 11A:
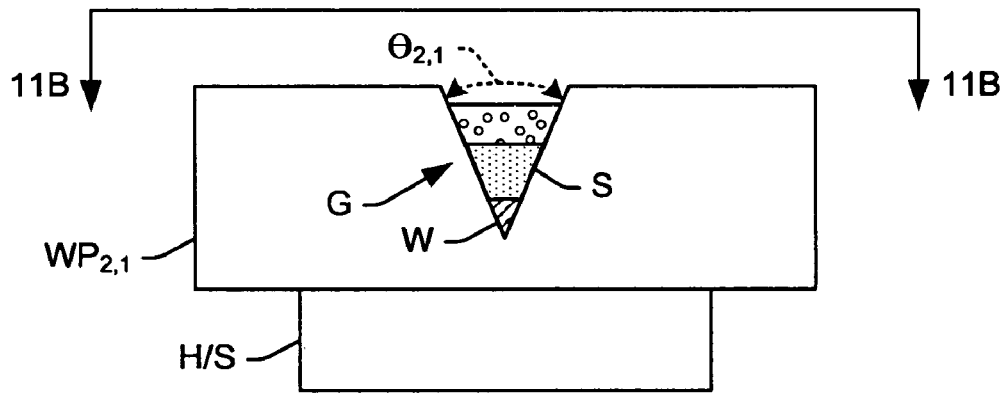
FIGS. 11A and 11B are end elevation and top plan views illustrating the test workpiece of FIGS. 10A–10B after a welding operation using the first welding flux consumable, in which the test weld underlies remaining slag at the bottom of the groove of angle $\theta_2$.
Figure 11B:
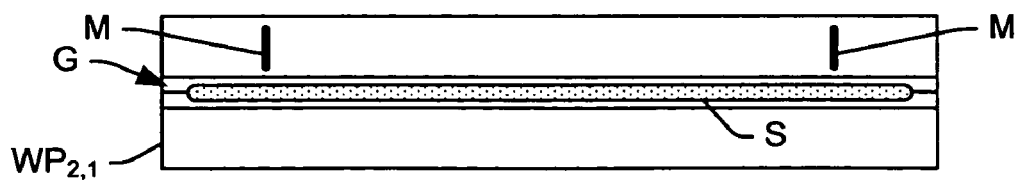
Figure 12:
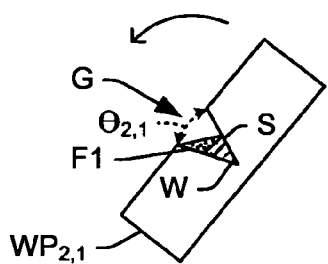
FIGS. 12 and 13 are end elevation views of the test workpiece of FIGS. 11A and 11B being inverted for unassisted gravitational slag removal.
Figure 13:
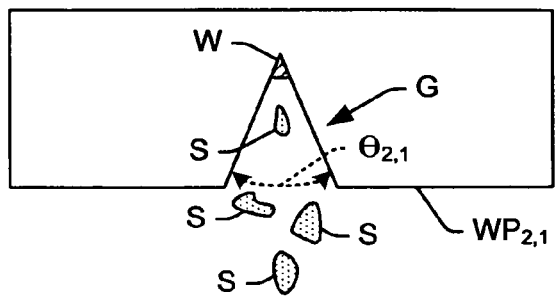
Figure 14A:
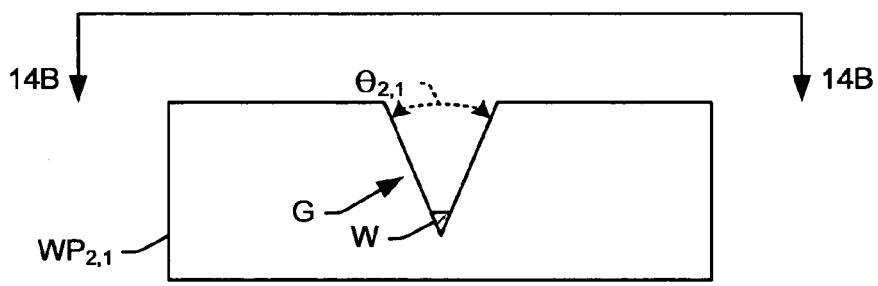
FIGS. 14A and 14B are end elevation and top plan views illustrating the test workpiece of FIG. 13 in the original upright position, wherein essentially all the slag has been removed by gravity for the first flux consumable and the smaller groove angle $\theta_2$.
Figure 14B:
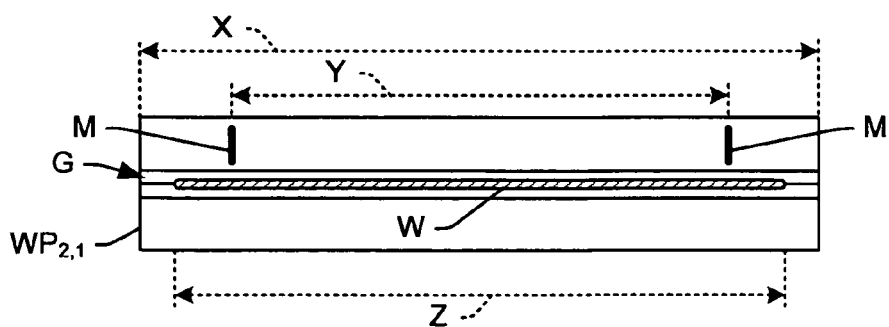
Figure 17:
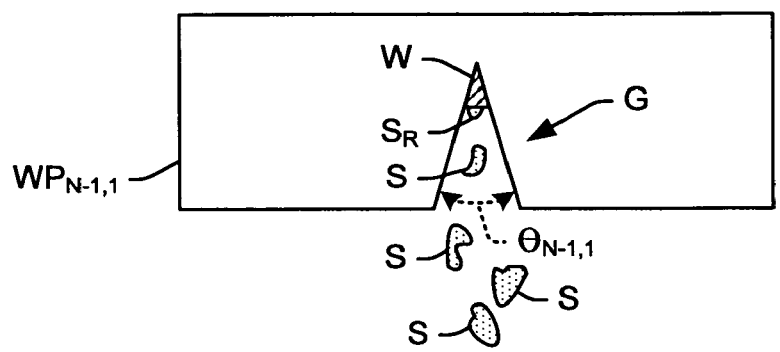
FIG. 17 is an end elevation view of the workpiece of FIGS. 16A and 16B inverted for unassisted gravitational slag removal.

The second workpiece $WP_{2,1}$ is accordingly provided at 6 having a groove angle $\theta_{2,1}$ that is smaller than the angle $\theta_{1,1}$ of the first workpiece, but which is otherwise dimensionally the same or similar (e.g., substantially identical other than the groove angle $\theta$), with the middle area thereof being marked at 8, as shown in FIGS. 10A and 10B. The above described steps at 10 and 20 are then repeated in the method 2, leaving the second workpiece $WP_{2,1}$ as shown in FIGS. 11A and 11B, with a weld W beneath remaining slag S at the bottom of the groove G. The standardized non-aggressive removal operation is then performed at 30 by inverting the workpiece $WP_{2,1}$, as shown in FIGS. 12 and 13, after which the length R of any remaining slag S is measured at 40. In the illustrated example of FIGS. 10A–14B, the standardized non-aggressive removal process at 30 (e.g., unassisted gravity removal) again leaves substantially no slag S, whereby the measured distance R in FIGS. 14A and 14B is zero (e.g., less than 50% of the middle area distance Y), and the determination at 50 (YES) results in a table entry of "REMOVED" being entered into the table 96 for the second workpiece $WP_{2,1}$ for the second angle $\theta_{2,1}$ as shown in FIG. 15.

At this point, it can be deduced from the table 96 in FIG. 15 that the granular flux F1 has adequate removal performance for angles at least as large as $\theta_{2,1}$ for submerged arc welding using the tested groove depth GD. The method 2 provides for continuing testing for all the workpieces $WP_{i,1}$ or until significant amounts of slag remain following the removal operation at 40, such that a minimum groove angle $\theta_{i,1MIN}$ can be identified for which the amount of remaining slag is less than the threshold amount T (e.g., Y/2 in one example). Once this minimum groove angle $\theta_{i,1MIN}$ is determined, the flux F1 can be rated accordingly, where the first flux rating can be stated in terms of the minimum angle $\theta_{i,1MIN}$ (e.g., flux F1 can be stated to be suitable for welds at or above $\theta_{i,1MIN}$) or in terms of the next smaller groove angle (e.g., flux F1 can be stated to be suitable for welds above $\theta_{i,1MIN+1}$).

Figure 18A:
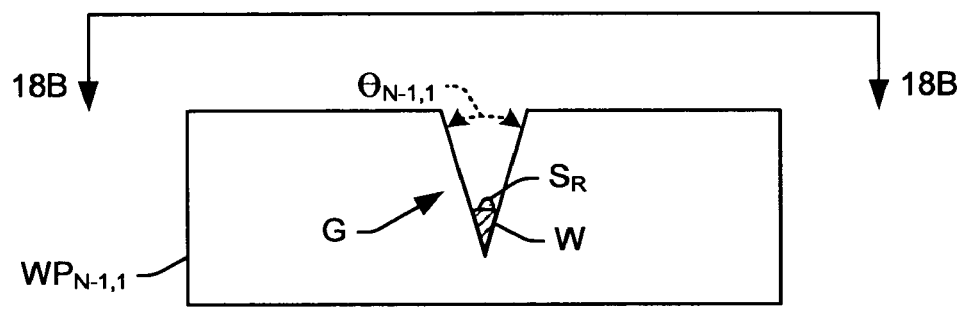
FIGS. 18A and 18B are end elevation and top plan views illustrating the test workpiece of FIG. 17 in the original upright position, in which slag remains over a test weld at the bottom of the V-shaped groove of angle $\theta_{N-1}$ having a length R greater than a threshold length following the unassisted gravitational removal operation.
Figure 18B:
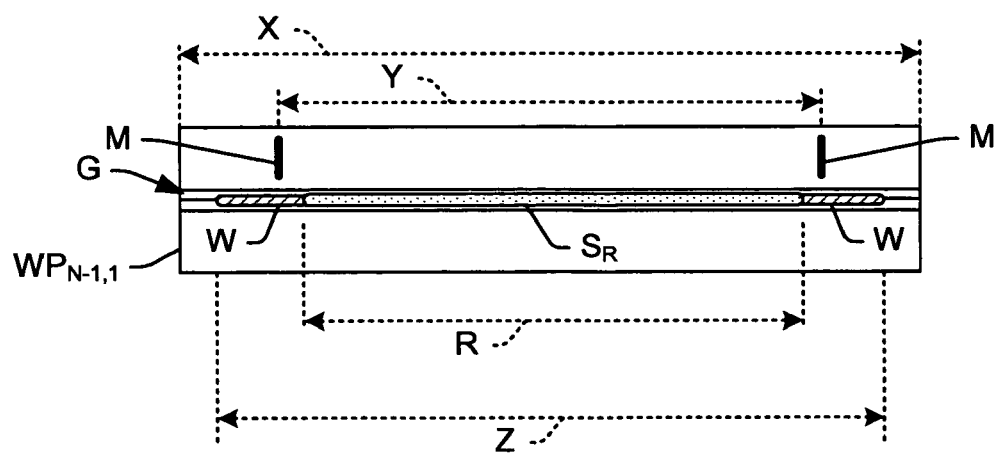

As shown in FIGS. 1 and 16A–18B, the process 2 continues at 6–62 in the illustrated example using workpieces $WP_{3,1}$ through $WP_{N-1,1}$ of successively smaller and smaller groove angles $\theta_{3,1}$ through $\theta_{N-1,1}$, with the workpiece $WP_{N-1,1}$ shown in FIGS. 16A and 16B after the welding operation at 20 having slag S overlying the test weld W in the groove G of angle $\theta_{N-1,1}$. The standardized non-aggressive (e.g., unassisted gravity) removal operation is then performed at 30 (FIG. 17) and the workpiece $\theta_{N-1,1}$ is reset in the upright position, wherein a non-zero length R of slag S remains in the groove G for this angle $\theta_{N-1,1}$ following the removal operation, as shown in FIGS. 18A and 18B. Furthermore, as seen in FIG. 18B, the length R of remaining slag $S_R$ exceeds 50% of the middle area length Y, wherein a determination is made at 50 (FIG. 1) that the length R is greater than or equal to the threshold T (NO at 50), and an entry of "NOT REMOVED" is accordingly made at 70 in the corresponding location in the table 96, as illustrated in FIG. 19.

The table column for the first flux F1 can then be used to provide a rating for F1 at 72, such as indicating the flux F1 as suitable for narrow gap deep groove welding at or above $\theta_{i,1MIN}$ (e.g., =$\theta_{N-1,1}$), after which the method 2 is completed for the first flux F1. In this manner, the method 2 provides for rating the flux F1 according to the smallest groove angle (e.g., $\theta_{N-1,1}$ in this case) for which the amount of remaining slag S is less than the threshold amount (e.g., remaining slag S is less than T=Y/2). At this point, entries of "NOT REMOVED" can accordingly be made for any angles smaller than $\theta_{N-1,1}$ as well. Such additional entries can be made without further testing, or alternatively, all the workpieces $WP_{i,1}$ in the set can be welded first, with the measurements being made later. In another possible implementation, various techniques can be made to ascertain the two determinative angles $\theta_{N-2,1}$ and $\theta_{N-1,1}$ without having to test all the workpieces WP in the set, for instance, by first testing an angle $\theta_{i,1}$ in the middle of the range, and deciding whether to proceed with larger or smaller angles based on the determination at 50 (e.g., Newton's method), whereby a rating for the flux F1 can be determined with less than all the workpieces WP needing to be tested. Thus, the invention provides techniques for rating a welding flux by providing a set of substantially identical workpieces with successively smaller groove angles welding the workpieces using the flux, performing a standardized non-aggressive slag removal operation, measuring the amount of remaining slag, determining the minimum groove angle for which the remaining slag is less than a threshold amount, and rating the flux consumable according to the minimum groove angle, wherein the method 2 is merely one example of many different embodiments possible within the scope of the invention.

Referring briefly to FIGS. 20 and 21, as mentioned above, the slag that remains after the removal operation may include discontinuities, but the amount of remaining slag may still be unacceptable. FIG. 20 illustrates such a situation, wherein two portions of SR remain in the weld groove G following the welding and removal operations having corresponding portion lengths R1 and R2. In this case, although the lengths R1 and R2 are both individually less than the threshold amount T, the sum R1+R2 is greater than T, and accordingly, the corresponding groove angle θ is identified in the results table as "NOT REMOVED". Furthermore, although the workpiece corresponding to the minimum angle $θ_{i,1MIN}$ may have substantially all the slag removed therefrom by the removal operation, other acceptable results may include some non-zero amount of remaining slag $S_R$ which is less than the threshold amount, an example of which is shown in FIG. 21. In this case, the remaining slag $S_R$ has a length R which is less than Y/2, where the corresponding table entry would be "REMOVED". Moreover, where more robust results are desired, one or more angles may be tested for the flux F1 using multiple workpieces WP, for example, with the measured lengths R for a given angle θ being averaged to determine whether the flux is characterized as "REMOVED" or "NOT REMOVED" for that angle θ. Also, the amount of angular change between successive workpieces may be reduced to provide a finer resolution to the process. In this regard, it may be desirable to test a further workpiece having a groove angle between $θ_{N-2,1}$ and $θ_{N-1,1}$ in the above example for the flux F1. In this situation, if the flux is characterized as "REMOVED" for such an intermediate angle, this angle would be the minimum angle $θ_{i,1MIN}$ and hence the rating for the first flux F1 would be based thereon. The process may then be repeated for one or more different welding positions or angles with a corresponding set of workpieces whereby the flux consumable F1 may have a corresponding rating for each such position, or the same may be repeated with another welding process parameter being varied with others being held constant to provide ratings corresponding to any welding process parameter of interest. Furthermore, as shown in FIGS. 36 and 37, the rating method 2 may be repeated again using the same welding process, using workpieces WP having U-shaped grooves G as shown in FIG. 37, with the set of workpieces WP having successively smaller sidewall angles (groove angles as used herein) to derive a rating for U-shaped grooves as well as a rating for V-shaped grooves as in FIG. 36.

Referring now to FIGS. 1 and 22–34, in accordance with another aspect of the invention, the method 2 may also be employed for ranking two or more fluxes through an objective comparative analysis, by which an informed decision can be made as to which flux is superior for a welding process of interest (e.g., SAW welding in narrow gap deep grooves in this example). In this case, once the first flux F1 has been assigned a rating at 72, the method 2 may optionally determine at 80 whether another flux is to be tested, and if so (YES at 80), the angle θ is reset to the initial (e.g., wide angle) value at 4, and the steps 6–72 are repeated using a second set of workpieces $WP_{j,2}$ with various groove angles $θ_{j,2}$, where the workpieces $WP_{j,2}$ are substantially identical to those of the first set. Moreover, it is preferable that both sets of workpieces WP be tested somewhat contemporaneously using the same welding equipment, welding process, removal operation, welding operator, etc., by which the resulting flux ratings can be compared to provide a relative ranking that represents a true measure of which flux is superior with respect to ease of removal. In the illustrated implementation, moreover, the number of workpieces M in the second set is the same as the number N for the first set (e.g., M=N), and the groove angles θ thereof are the same (e.g., $θ_{i,1}=θ_{j,2}$), although this is not a requirement of the invention. It is further noted at this point that it is possible to provide comparative analysis and relative rankings for any integer number of fluxes using the methods of the invention, including the exemplary method 2 of FIG. 1.

Figure 22A:
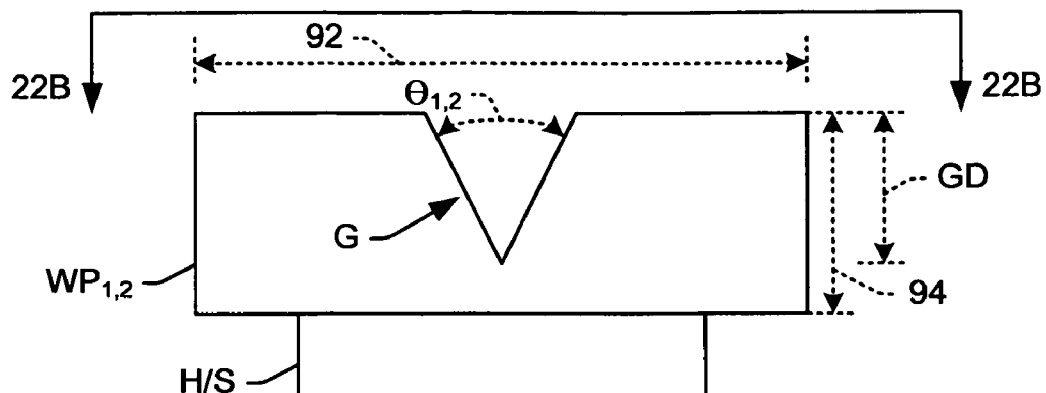
FIGS. 22A and 22B are end elevation and top plan views illustrating another exemplary test workpiece similar to that of FIGS. 2A and 2B above with a V-shaped groove of the first groove angle $\theta_1$ formed therein for evaluating and comparing the performance of a second welding consumable granular flux in the illustrated SAW welding process example.
Figure 22B:
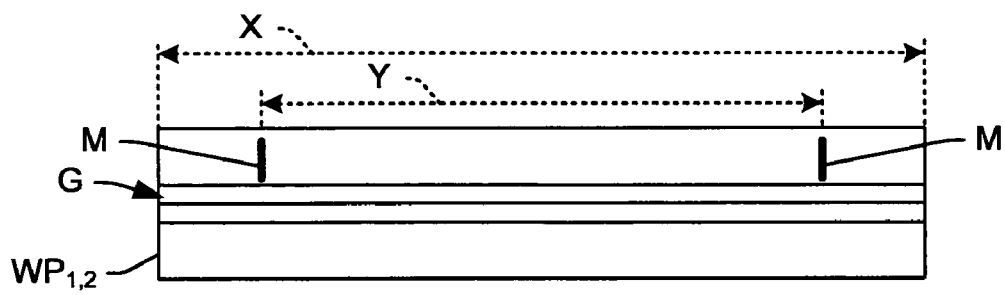
Figure 23A:
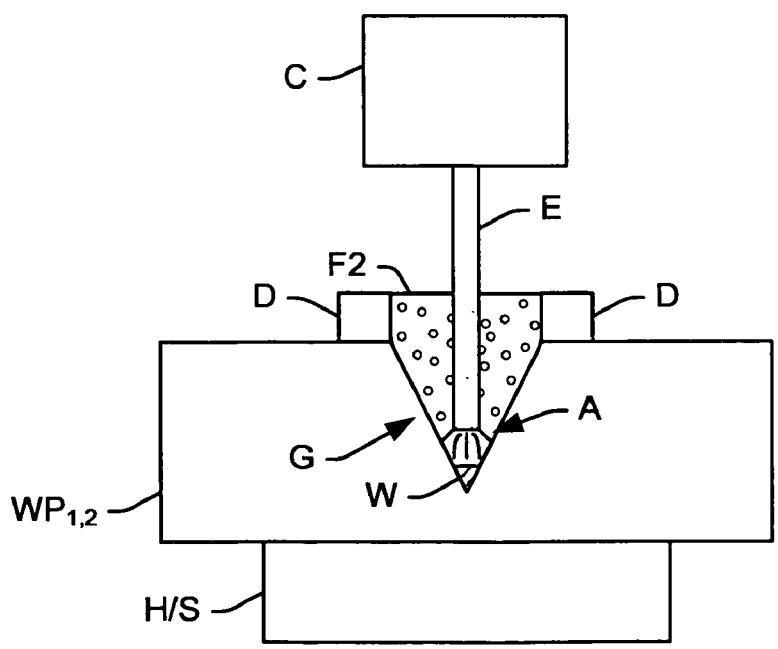
FIGS. 23A–23C are end elevation and top plan views illustrating the workpiece of FIGS. 22A and 22B with first angle $\theta_1$ undergoing the exemplary submerged arc weld operation to form a first pass test weld using the second flux consumable.
Figure 23B:
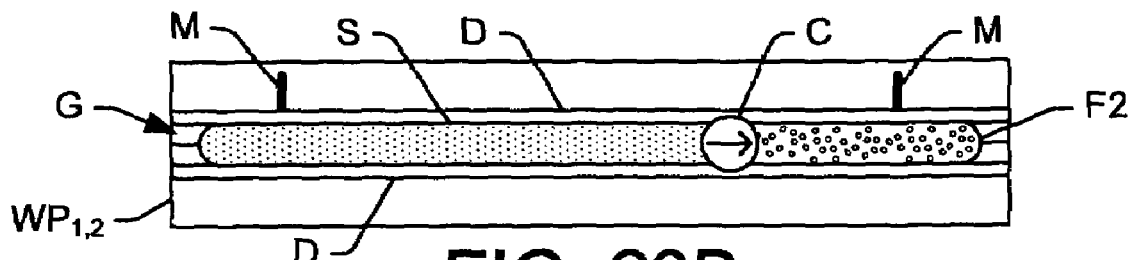
Figure 23C:
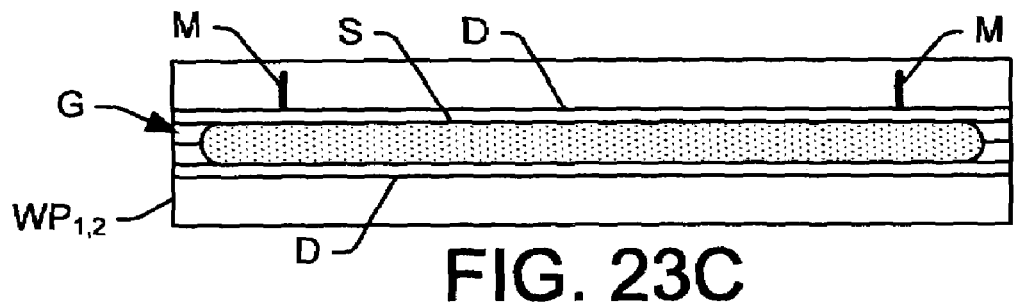
Figure 24A:
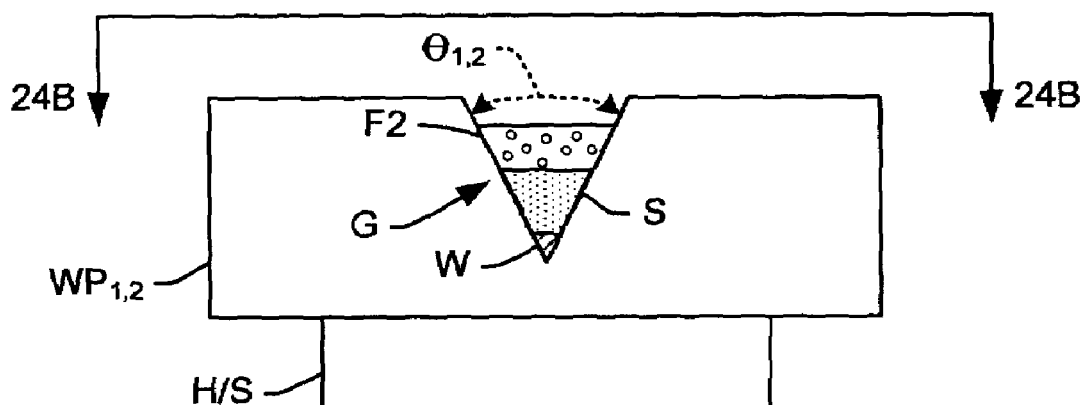
FIGS. 24A and 24B are end elevation and top plan views illustrating the test workpiece after the welding operation of FIGS. 23A–23C with a test weld at the bottom of the groove underlying slag from the second flux.
Figure 24B:
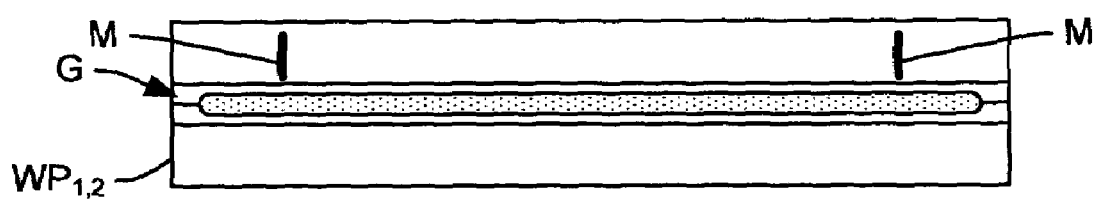
Figure 25:
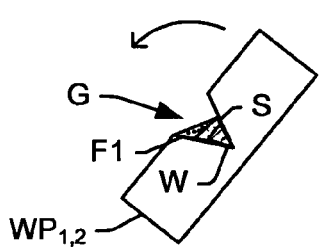
FIGS. 25 and 26 are end elevation views of the test workpiece of FIGS. 24A and 24B being inverted for unassisted gravitational slag removal.
Figure 26:
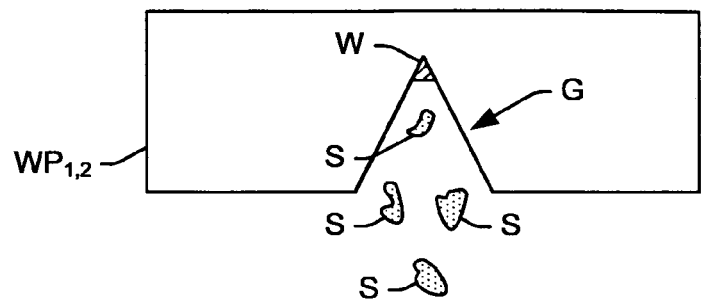
Figure 27A:
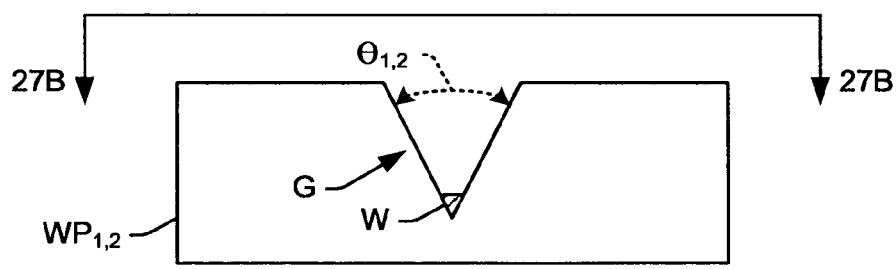
FIGS. 27A and 27B are end elevation and top plan views illustrating the test workpiece of FIG. 26 upright, where essentially all the slag has been removed by gravity for the second tested consumable flux and the first angle $\theta_1$.
Figure 27B:
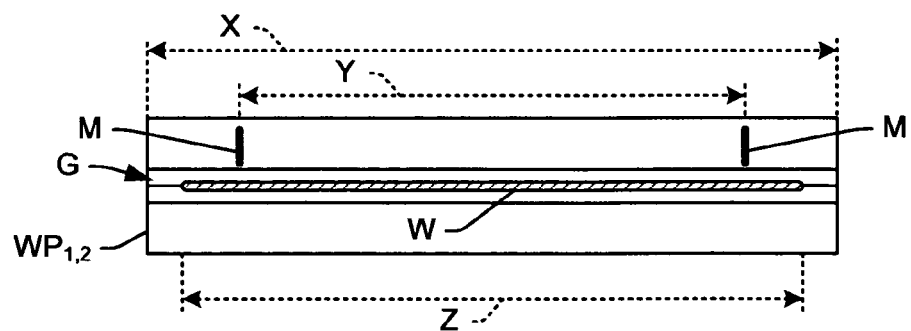
Figure 30:
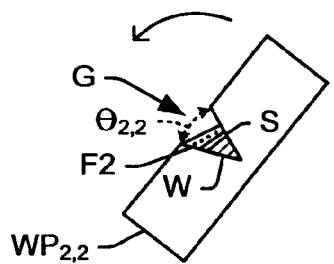
FIGS. 30 and 31 are end elevation views of the test workpiece of FIGS. 29A and 29B being inverted for unassisted gravitational slag removal, and FIGS. 32A and 32B further illustrate the workpiece after being repositioned upright, in which slag remains over a test weld at the bottom of the V-shaped groove of angle $\theta_2$ having a length R greater than a threshold length following the unassisted gravitational slag removal.
Figure 31:
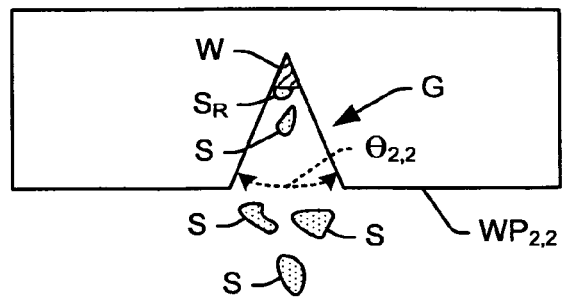

As shown in FIGS. 22A and 22B, a first workpiece $WP_{1,2}$ of the second set is provided, having a groove G of angle $θ_{1,2}$, which in this example is the same angle $θ_{1,1}$ as in the workpiece $WP_{1,1}$ (FIG. 2A above). The workpiece $WP_{1,2}$ is welded in FIGS. 23A–23C using the same welding process as was employed for the first set except that the second flux F2 is employed, leaving a test weld W at the bottom of the groove G underneath remnant slag S, as illustrated in FIGS. 24A and 24B. The workpiece $WP_{1,2}$ is then subjected to the same unassisted gravitational removal by inversion (FIGS. 25 and 26) to allow all, some, or none of the slag S to fall out, and the workpiece $WP_{1,2}$ is reset upright as shown in FIGS. 27A and 27B. In this example, all of the slag is removed by the inversion, wherein an entry is made in the second column of the table 96 in FIG. 28 indicating "REMOVED" for the second flux F2 at the angle $θ_{1,2}$.

Figure 32A:
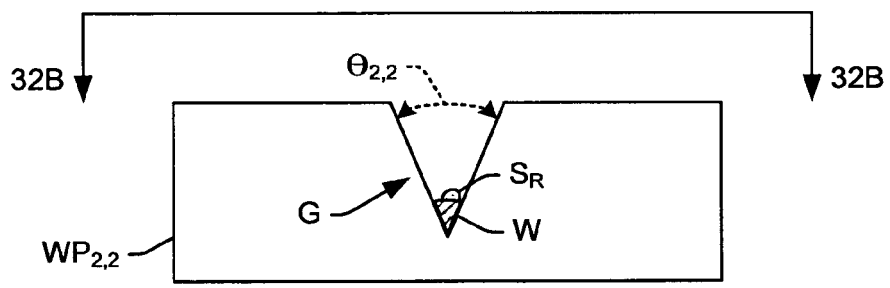
Figure 32B:
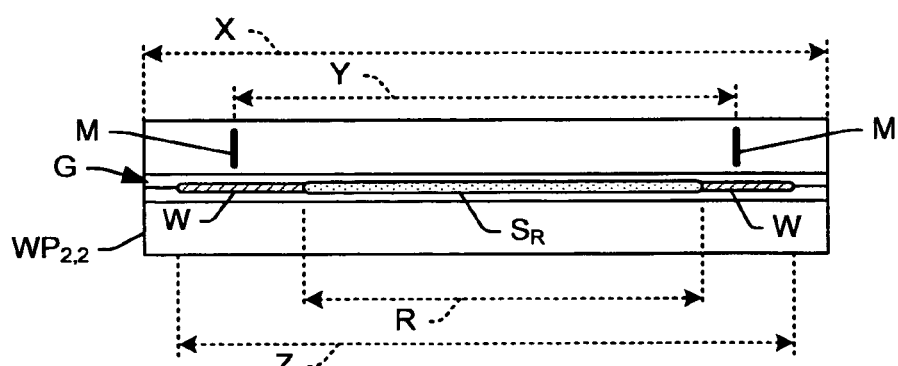

The process 2 is repeated again for the second workpiece $WP_{2,2}$ of the second set, with an angle $θ_{2,2}$, including welding using the second flux F2 leaving slag S overlying the resulting weld W (FIGS. 29A and 29B), standardized non-aggressive removal (FIGS. 30 and 31), and measurement of remaining slag $S_R$ (FIGS. 32A and 32B). It is noted in this example, that a significant amount of slag $S_R$ remains in the groove G of the second workpiece $WP_{2,2}$ of the second set, where the corresponding length R exceeds the threshold amount T (e.g., R is greater than Y/2), whereby a corresponding entry of "NOT REMOVED" is provided in the second column of table 96 in FIG. 33. From this, the minimum acceptable angle $θ_{j,2MIN}$ is determined as being $θ_{1,2}$ for the second flux F2 at which the amount of remaining slag is less than the threshold T, and the second flux F2 is accordingly rated as suitable only for narrow gap deep groove welding at or above $θ_{j,2MIN}$ (e.g., $=θ_{1,2}$). In accordance with comparative aspects of the invention, moreover, the fluxes F1 and F2 can be ranked from the testing, wherein F1 is clearly superior to F2 with respect to removability. In this regard, while flux F2 is operationally limited to weld angles at or above $θ_{1,2}$ ($θ_{1,1}$), the first flux F1 can be easily employed to much narrower groove angles at or above $θ_{N-2,1}$ ($θ_{M-2,2}$) Thus, the invention allows the angle for a given welding application to be minimized intelligently within the limitations of a given flux by providing a rating therefor, and also allows informed selection between two or more competing fluxes based on objective comparative analysis and ranking.

Referring now to FIG. 34, the rating and ranking aspects of the invention may be carried out using a variety of tabular or other types of representations. For example, FIG. 34 illustrates another possible results table 98 having entries for the remaining slag length R for first and second fluxes, with different rows corresponding to specified groove angles θ. In this example, a middle area length Y of 10 inches is used, with essentially unremoved slag results being shown as 10", and total removal being indicated as 0". From the table 98, it can be appreciated that the first flux is useable down to angles of 60 degrees, whereas the second flux is only good for relatively wide angles above about 110 degrees. Thus, the ratings and rankings of the invention could be used to tailor (e.g., minimize) the weld angle for a particular welding application so as to conserve consumables and to maximize lineal weld speed, and also to determine that the groove angle could be as small as about 60 degrees if flux F1 is selected.

Figure 35A:
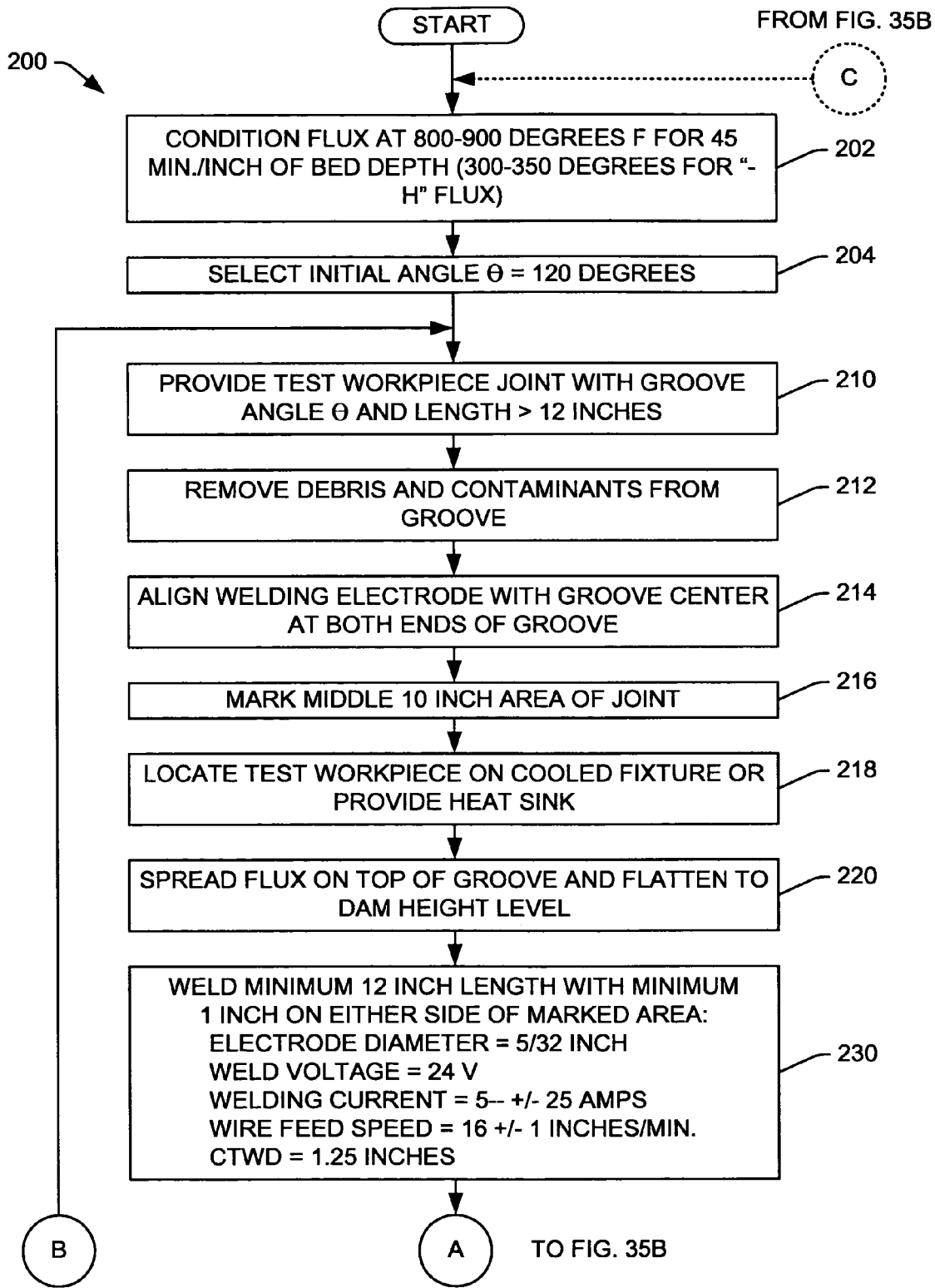
FIGS. 35A and 35B are detailed flow diagrams together illustrating an exemplary implementation of a method in accordance with the present invention.
Figure 35B:
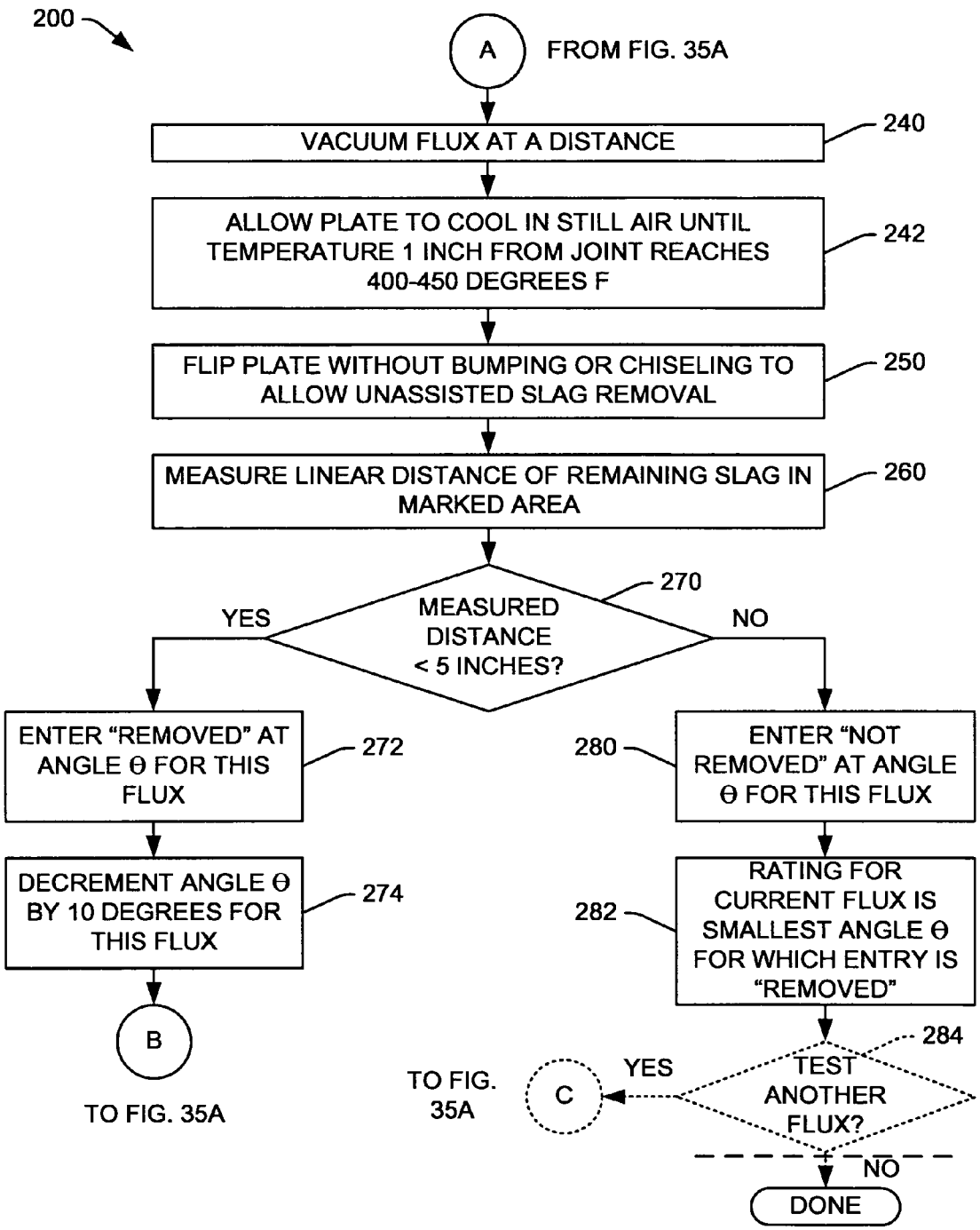

FIGS. 35A and 35B illustrate another more specific implementation of the invention, wherein a method 200 is shown for rating a flux with respect to ease of slag removal in narrow gap deep groove submerged arc welding. As with the above method 2 in FIG. 1, the method 200 may also be implemented to provide for comparative analysis of two or more fluxes, allowing a plurality of fluxes to be ranked according to removability. Moreover, as discussed above, the invention may be employed in characterizing, rating, and/or ranking fluxes other than submerged arc granular fluxes for use in other welding processes, and for other than narrow gap, deep groove welding applications. Beginning at 202 in FIG. 35A, the flux under test is initially conditioned at 800–900 degrees F. for 45 minutes per inch of flux bed depth. In the example illustrated above, the flux depth or height of 1 inch was used, and in such a situation, the flux is preconditioned at high temperature for about 45 minutes at 202. Alternatively, if a "–H" (e.g., low hydrogen) flux is being rated or analyzed, a lower conditioning temperature of 300–350 is used at 202. In this regard, it is preferable to ensure that any flux or fluxes being evaluated are stored in an airtight container or bag in order to minimize moisture pickup to thereby minimize the corresponding effect on slag removal, and in any event, to ensure that the fluxes are treated similarly in all respects if comparative analysis or ranking is being undertaken using the methods of the invention.

An initial angle θ of 120 degrees is set at 204 and a test piece with workpiece of angle θ is provided at 210 with a groove length X of more than about 12 inches (e.g., about 14 inches in the above FIGURES). The groove is cleaned at 212 with any debris and contaminants being removed therefrom using any suitable cleaning and/or treating methods, such as blowing out the joint using compressed air, cleaning with solvents, etc., separately or in combination. The welding electrode E is then aligned at both ends of the weld groove G at 214 to ensure that the welding proceeds generally down the middle of the groove G in the subsequent welding operation, and a 10 inch long middle area is marked at 216 on the workpiece W1 (e.g., length Y=10 inches). The workpiece is situated on a cooled fixture and/or heat sinking is provided at 218 to ensure that temperature effects are uniform across the length of the groove (e.g., or at least the marked middle area portion thereof), and the flux under test is spread on top of the groove and flattened at 220 to a flux height of about 1 inch using dams if necessary. A welding operation is then performed at 230 to form a test weld W with a minimum length of about 12 inches, including a minimum of about 1 inch on either side of the marked middle area using a welding electrode E with a diameter of about 5/32 inches, a welding voltage of about 24V, a welding current of about 500±25 amps, a wire feed speed of about 16±1 inches per minute, and a contact to work distance (CTWD) of about 1.25 inches in a submerged arc welding process.

The method 200 then proceeds to 240 in FIG. 35B, whereat the flux may be optionally vacuumed, while ensuring that the vacuum does not get close to the slag, and the workpiece WP is allowed to cool at 242 in still air until the temperature about 1 inch from the weld W reaches between about 400 and 450 degrees F., wherein temperature sensors can be used to determine this temperature. In this regard, care should be taken to ensure that the electrode placement (centering or alignment at 214) or the grounding/arc blow does not influence the slag removal, which may include visually inspecting the weld bead shape and ensuring that it is uniform and well centered. At 250, the workpiece plate is flipped or inverted without bumping or chiseling (e.g., unassisted gravity removal), wherein the workpiece is preferably flipped over in air and the slag should be allowed to fall out with no attempt to manually aid the slag removal. The linear distance R of the remaining slag is then measured at 260 in the marked middle area of interest, for example, to the nearest eighth of an inch.

A determination is made at 270 as to whether the measured remaining slag distance R is less than 5 inches. If the measurement R is less than 5 inches (YES at 272), the slag is deemed "REMOVED" and this result is entered in the table of results at 272. The angle θ is thereafter decremented by 10 degrees at 274 and the method 200 returns to 210 in FIG. 35A as described above for testing another workpiece. If, however, the measurement R is greater than or equal to 5 inches (NO at 270), the slag is deemed "NOT REMOVED" and is entered as such in the table at 280 for the angle θ, and the flux is rated at 282 as suitable for the minimum or smallest angle for which a "REMOVED" indication is entered in the table. If a more rigorous determination is desired, the test for the current angle and flux may be repeated. Moreover, the relevant flux angles θ thus obtained can be converted to a numeric rating system for a given tested flux. In addition, as with the method 2 above, more than one flux can be evaluated and ranked using the method 200, in which case a determination is made at 284 as to whether another flux is to be tested. If so (YES at 284), the method 200 returns to 202 in FIG. 35A, and the process repeats at 202 through 282 for the other fluxes as previously described.

Figure 38:
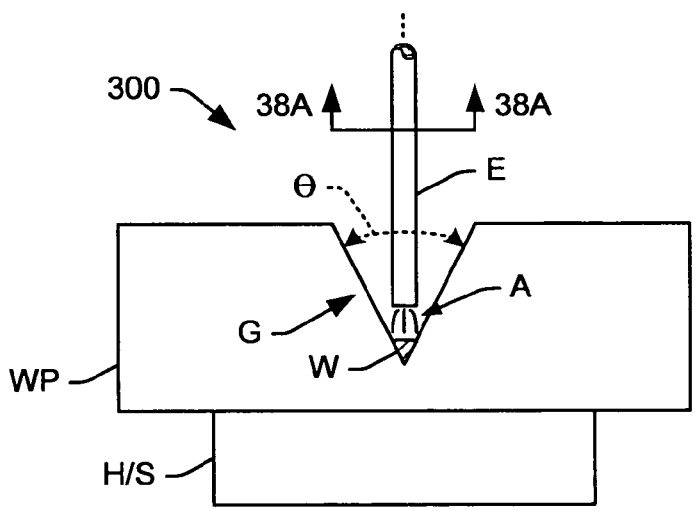
FIG. 38 is an elevation view illustrating a test workpiece undergoing a flux cored arc welding (FCAW) process to form a first pass test weld at the bottom of the workpiece groove, resulting in melting of flux from the core of the welding electrode consumable and formation of slag in the workpiece groove in accordance with another aspect of the invention.
Figure 39:
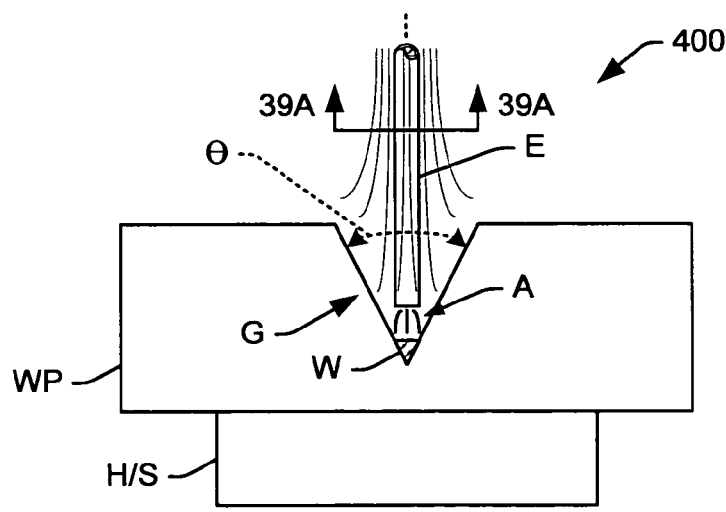
FIG. 39 is an elevation view illustrating another test workpiece undergoing a GMAW arc welding process using a solid welding electrode consumable with an outer coating providing flux for the process to form a first pass test weld at the bottom of the workpiece groove, resulting in melting of flux from the outer electrode coating and formation of slag in the workpiece groove in accordance with another aspect of the invention.
Figure 39A:
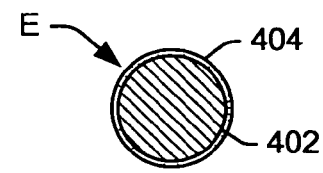
FIG. 39A is a partial plan view in section along line 39A—39A of FIG. 39, illustrating an exemplary solid welding electrode consumable with an outer coating used in the process of FIG. 39.

Referring also to FIGS. 38–39A, although illustrated and described above in the context of submerged arc welding (SAW) processes, the invention finds utility in characterizing slag removability performance of fluxing agents provided by any mechanism in a welding process. In this regard, the invention may be employed in characterizing performance of granular flux used in SAW processes, as well as other forms of flux delivery, including but not limited to flux cored welding electrodes having a metal sheath surrounding a core fill material that includes flux elements used in FCAW processes, stick welding, and other solid wire welding processes using electrode wire having an outer surface coated with flux materials (e.g., electrodes sold under the trademark OUTERSHIELD). Furthermore, the methods of the invention may be used in processes in which shielding gas such as argon, $CO_2$, or mixtures thereof, is provided around the welding arc (whether externally provided or created from electrode core materials) to inhibit oxidation or nitridation of the molten metal, (e.g., gas metal arc welding (GMAW) processes). Furthermore, the methods of the invention are applicable in characterizing flux performance with respect to processes using any mechanism to transfer the molten electrode material to the workpiece, including but not limited to short-circuit welding, spray arc welding, pulse welding, etc.

Figure 38A:
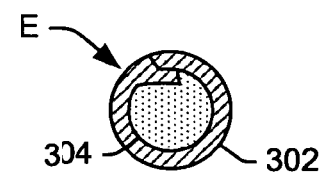
FIG. 38A is a partial plan view in section along line 38A—38A of FIG. 38, illustrating an exemplary flux cored welding electrode consumable.

FIGS. 38 and 38A illustrate another implementation of the above methods, in which a test workpiece WP is undergoing a flux cored arc welding (FCAW) process 300 to form a first pass test weld at the bottom of the workpiece groove G, resulting in melting of flux from the core of the welding electrode and formation of slag S in groove G. FIG. 38A shows a sectional view of the flux cored welding electrode E taken along line 38A—38A in FIG. 38, wherein the cored electrode E includes a granular or powder center core fill material 304 surrounded by a metal sheath material 302. The core fill material 304 includes fluxing components that form slag (not shown) over the weld W, and may also comprise deoxidizing and denitriding agents, alloying materials, and elements that increase toughness and strength, improve corrosion resistance, and stabilize a welding arc. In the FCAW process 300, the welding arc A melts the core 304 and the sheath 302, with the molten sheath material 302 being deposited on the workpiece WP to form the weld W. If shielding gas (not shown) is used in process 300, such gas can be applied externally through a nozzle associated with a welding torch (not shown), or it may be generated from the decomposition of gas forming ingredients contained in the electrode core 304 of electrode E (e.g., self-shielded FCAW processes). In such self-shielded FCAW, the heat of the arc causes decomposition and some vaporization of the electrode's flux core material 304, which partially protects the molten metal. Any of the above methods 2, 200 or other test methods of the invention may be implemented in order to characterize the flux of process 300 or other FCAW processes, for example, to provide ratings for individual flux cored welding electrodes E and/or for comparative evaluation of two or more such electrodes E using the above-described or equivalent techniques.

Another possible implementation can be used to characterize flux performance with respect to slag removability in shielded metal arc welding (SMAW or stick welding) or solid electrode welding processes 400, as shown in FIGS. 39 and 39A. The process 400 involves provision of a welding arc A between the test workpiece WP and a solid metal welding electrode E, wherein FIG. 39A illustrates a sectional view of the exemplary solid electrode E taken along line 39A—39A in FIG. 39. As shown in FIG. 39, moreover, a shielding gas is provided through any suitable means around the welding arc A and the weld W to protect against oxidation or nitridation of the weld metal W, wherein the electrode E includes a solid metal cylindrical wire structure 402 providing the molten weld metal W, along with a coating 404 of flux materials that melt during process 400 to provide protective slag (not shown). Thus, the consumable being ranked or rated may be a solid electrode with a flux coating in a stick welding, or gas metal arc welding (GMAW) process, or a process without shielding gas. As with the above examples, the remnant amount of such slag can be measured and the performance of a given solid electrode E can thus be evaluated using the above-described or equivalent techniques in order to obtain objective ratings for individual solid electrodes E and/or for comparative evaluation of two or more such electrodes.

The invention has been illustrated and described with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A method for rating a welding consumable for use in arc welding operations, said method comprising:
   providing a set of workpieces, said set including a plurality of substantially identical workpieces individually having a groove with a corresponding groove angle formed therein, said set of workpieces having successively smaller groove angles with a first workpiece of said set having the largest groove angle and a last workpiece of said set having the smallest groove angle;
   performing a welding operation using said consumable to create a weld in said groove of each said workpiece;
   performing a standardized non-aggressive slag removal operation on said workpieces after said welding operation;
   measuring an amount of remaining slag for each said workpiece after performing said standardized non-aggressive slag removal operation;
   determining a minimum groove angle for which said amount of remaining slag is less than a threshold amount; and,
   rating said consumable according to said minimum groove angle.

2. A method as defined in claim 1, further comprising
   providing a second set of workpieces, said second set including a plurality of substantially identical workpieces individually having a groove with a corresponding groove angle formed therein, said second set of workpieces having successively smaller groove angles with a first workpiece of said second set having the largest groove angle and a last workpiece of said second set having the smallest groove angle;
   performing said welding operation to create a weld in said groove of each said workpiece of said second set using a second consumable;
   performing said standardized non-aggressive slag removal operation on said workpieces of said second set after said welding operation;
   measuring an amount of remaining slag for each said workpiece of said second set after performing said standardized non-aggressive slag removal operation;
   determining a second minimum groove angle for which said amount of remaining slag is less than said threshold amount; and,
   ranking said consumable and said second consumable according to said minimum groove angle and said second minimum groove angle.

3. A method as defined in claim 1, wherein said standardized non-aggressive slag removal operation comprises inverting said workpieces after said welding operation to allow loose slag to fall from said grooves.

4. A method as defined in claim 1, wherein said grooves are of substantially equal longitudinal groove lengths; wherein said welds are of substantially equal longitudinal weld lengths in said grooves; wherein said welds are formed within a middle area of each said groove and extend beyond either end of said middle area of each groove, said middle area having a longitudinal middle area length; wherein said weld length is greater than said middle area length and said groove length is greater than said weld length; wherein measuring said amount of remaining slag comprises measuring a longitudinal remaining slag length of remaining slag in said grooves; and wherein said threshold amount is about half said longitudinal middle area length.

5. A method as defined in claim 4, wherein said middle area length is about 6 inches or more and wherein said welds extend past each end of said middle areas by about one inch or more.

6. A method as defined in claim 1, wherein said grooves are generally V-shaped or generally U-shaped grooves.

7. A method as defined in claim 1, wherein each of said grooves is about 0.75 inches deep or more.

8. A method as defined in claim 1, wherein said welding operation is a submerged arc welding operation.

9. A method as defined in claim 8, wherein said consumable is a granular flux piled in said grooves preparatory to welding.

10. A method as defined in claim 1, wherein said consumable is a granular flux piled in said grooves preparatory to welding.

11. A method as defined in claim 1, wherein said welding operation is a gas metal arc welding operation.

12. A method as defined in claim 11, wherein said consumable is a solid electrode with a flux coating.

13. A method as defined in claim 1, wherein said consumable is a solid electrode with a flux coating.

14. A method as defined in claim 1, wherein said welding operation is a flux cored arc welding operation.

15. A method as defined in claim 14, wherein said consumable is a flux cored welding electrode having a core fill material comprising a flux material.

16. A method as defined in claim 1, wherein said consumable is a flux cored welding electrode having a core fill material comprising a flux material.

17. A method for comparing ease of slag removal with respect to two or more welding consumables for use in arc welding operations, said method comprising:
    providing first and second sets of workpieces, each said set including a plurality of substantially identical workpieces having a groove with a corresponding groove angle formed therein, said sets including workpieces having successively smaller groove angles with a first workpiece of each set having the largest groove angle and a last workpiece in each set having the smallest groove angle in a corresponding angular range;
    performing a welding operation to create a weld in said groove of each said workpiece using a first consumable for workpieces of said first set and using a second consumable for workpieces of said second set;
    performing a standardized non-aggressive slag removal operation on said workpieces of both said sets after said welding operation;
    measuring an amount of remaining slag for each said workpiece after performing said standardized non-aggressive slag removal operation;
    determining a first minimum groove angle for which said amount of remaining slag is less than a threshold amount for workpieces of said first set welded using said first consumable;
    determining a second minimum groove angle for which said amount of remaining slag is less than said threshold amount for workpieces of said second set welded using said second consumable; and,
    ranking said first and second consumables according to said minimum groove angles.

18. A method as defined in claim 17, wherein said standardized non-aggressive slag removal operation comprises inverting said workpieces after said welding operation to allow loose slag to fall from said grooves.

19. A method as defined in claim 17, wherein said grooves are of substantially equal longitudinal groove lengths; wherein said welds are of substantially equal longitudinal weld lengths in said grooves; wherein said welds are formed within a middle area of each said groove and extend beyond either end of said middle area of each groove, said middle area having a longitudinal middle area length; wherein said weld length is greater than said middle area length and said groove length is greater than said weld length; wherein measuring said amount of remaining slag comprises measuring a longitudinal remaining slag length of remaining slag in said grooves; and wherein said threshold amount is about half said longitudinal middle area length.

20. A method as defined in claim 19, wherein said middle area length is about 6 inches or more and wherein said welds extend past each end of said middle areas by about one inch or more.

21. A method as defined in claim 19, wherein said grooves are generally V-shaped or generally U-shaped grooves.

22. A method as defined in claim 18, wherein said grooves are generally V-shaped or generally U-shaped grooves.

23. A method as defined in claim 17, wherein said grooves are generally V-shaped or generally U-shaped grooves.

24. A method as defined in claim 23, wherein each of said grooves G is about 0.75 inches deep or more.

25. A method as defined in claim 19, wherein each of said grooves G is about 0.75 inches deep or more.

26. A method as defined in claim 18, wherein each of said grooves G is about 0.75 inches deep or more.

27. A method as defined in claim 26, wherein said welding operation is a submerged arc welding operation and wherein said first and second consumables are granular fluxes piled in said grooves preparatory to welding.

28. A method as defined in claim 25, wherein said welding operation is a submerged arc welding operation and wherein said first and second consumables are granular fluxes piled in said grooves preparatory to welding.

29. A method as defined in claim 19, wherein said welding operation is a submerged arc welding operation and wherein said first and second consumables are granular fluxes piled in said grooves preparatory to welding.

30. A method as defined in claim 18, wherein said welding operation is a submerged arc welding operation and wherein said first and second consumables are granular fluxes piled in said grooves preparatory to welding.

31. A method as defined in claim 17, wherein said welding operation is a submerged arc welding operation and wherein said first and second consumables are granular fluxes piled in said grooves preparatory to welding.

32. A method as defined in claim 1–7, wherein said welding operation is a submerged arc welding operation.

33. A method as defined in claim 32, wherein said consumable is a granular flux piled in said grooves preparatory to welding.

34. A method as defined in claim 17, wherein said consumable is a granular flux piled in said grooves preparatory to welding.

35. A method as defined in claim 17, wherein said welding operation is a gas metal arc welding operation.

36. A method as defined in claim 35, wherein said consumable is a solid electrode with a flux coating.

37. A method as defined in claim 17, wherein said consumable is a solid electrode with a flux coating.

38. A method as defined in claim 17, wherein said welding operation is a flux cored arc welding operation.

39. A method as defined in claim 38, wherein said consumable is a flux cored welding electrode having a core fill material comprising a flux material.

40. A method as defined in claim 17, wherein said consumable is a flux cored welding electrode having a core fill material comprising a flux material.

41. A method for comparing ease of removal of slag with respect to two or more welding consumables for use in arc welding operations, said method comprising:
    providing a first set of workpieces, said first set including N workpieces $WP_{i,1}$, N being an integer greater than 2 and i being an integer from 1 to N, each said workpiece $WP_{i,1}$ being of substantially identical dimensions and having a groove G with a corresponding groove angle $\theta_{i,1}$ formed therein in a first angular range, said workpieces $WP_{i,1}$ having successively smaller groove angles $\theta_{i,1}$ with a first workpiece $WP_{1,1}$ of said first set having a first groove angle $\theta_{1,1}$, and an Nth workpiece $WP_{N,1}$ of said first set having an Nth groove angle $\theta_{N,1}$, said first groove angle $\theta_{i,1}$ being the largest angle and said Nth groove angle $\theta_{N,1}$ being the smallest angle in said first angular range;
    providing a second set of workpieces, said second set including M workpieces $WP_{j,2}$, M being an integer greater than 2 and j being an integer from 1 to M, each said workpiece $WP_{j,2}$ being of substantially identical dimensions to those of said first set, each said workpiece $WP_{j,2}$ of said second set having a groove G with a corresponding groove angle $\theta_{j,2}$ formed therein in a second angular range, said workpieces $WP_{j,2}$ having successively smaller groove angles $\theta_{j,2}$ with a first workpiece $WP_{1,2}$ of said second set having a first groove angle $\theta_{1,2}$, and an Mth workpiece $WP_{M,2}$ of said second set having an Mth groove angle $\theta_{M,2}$, said first groove angle $\theta_{1,2}$ being the largest angle and said Mth groove angle $\theta_{M,2}$ being the smallest angle in said second angular range;
    performing a welding operation to create welds W in said grooves G of said workpieces $WP_{i,1}$ of said first set using a first consumable;
    performing a standardized non-aggressive slag removal operation on said workpieces $WP_{i,1}$ of said first set after said welding operation;
    measuring an amount R of remaining slag S for each workpiece $WP_{i,1}$ of said first set after performing said standardized non-aggressive slag removal operation on said workpieces $WP_{i,1}$;
    determining a first minimum groove angle $\theta_{i,1MIN}$ for which said amount R of remaining slag is less than a threshold amount T for said first consumable;
    performing said welding operation to create welds W in said grooves G of said workpieces $WP_{j,2}$ of said second set using a second consumable;
    performing said standardized non-aggressive slag removal operation on said workpieces $WP_{j,2}$ of said second set after said welding operation;
    measuring an amount R of remaining slag S for each workpiece $WP_{j,2}$ of said second set after performing said standardized non-aggressive slag removal operation on said workpieces $WP_{j,2}$;
    determining a second minimum groove angle $\theta_{j,2MIN}$ for which said amount R of remaining slag is less than a threshold amount T for said second consumable; and,
    ranking said first and second consumables according to said minimum groove angles $\theta_{i,1MIN}$ and $\theta_{j,2MIN}$.

42. A method as defined in claim 41, wherein N=M, and wherein $\theta_{i,1}=\theta_{j,2}$.

43. A method as defined in claim 41, wherein said welding operation is a submerged arc welding operation and wherein said first and second consumables are granular fluxes piled in said grooves preparatory to welding.

44. A method as defined in claim 41, wherein said welding operation is a submerged arc welding operation.

45. A method as defined in claim 44, wherein said consumable is a granular flux piled in said grooves preparatory to welding.

46. A method as defined in claim 41, wherein said consumable is a granular flux piled in said grooves preparatory to welding.

47. A method as defined in claim 41, wherein said welding operation is a gas metal arc welding operation.

48. A method as defined in claim 47, wherein said consumable is a solid electrode with a flux coating.

49. A method as defined in claim 41, wherein said consumable is a solid electrode with a flux coating.

50. A method as defined in claim 41, wherein said welding operation is a flux cored arc welding operation.

51. A method as defined in claim 50, wherein said consumable is a flux cored welding electrode having a core fill material comprising a flux material.

52. A method as defined in claim 41, wherein said consumable is a flux cored welding electrode having a core fill material comprising a flux material.

53. A method as defined in claim 41, wherein each of said grooves G is about 0.75 inches deep or more.

54. A method as defined in claim 41, wherein said grooves are generally V-shaped or generally U-shaped grooves.

55. A method as defined in claim 41, wherein said standardized non-aggressive slag removal operation comprises inverting said workpieces after said welding operation to allow loose slag to fall from said grooves.

56. A method as defined in claim 41, wherein said grooves are of substantially equal longitudinal groove lengths; wherein said welds are of substantially equal longitudinal weld lengths in said grooves; wherein said welds are formed within a middle area of each said groove and extend beyond either end of said middle area of each groove, said middle area having a longitudinal middle area length; wherein said weld length is greater than said middle area length and said groove length is greater than said weld length; wherein measuring said amount of remaining slag comprises measuring a longitudinal remaining slag length of remaining slag in said grooves; and wherein said threshold amount is about half said longitudinal middle area length.

57. A system for rating a welding consumable, said system comprising:
    a set of substantially identical workpieces individually having a groove with a corresponding groove angle formed therein, said set of workpieces having successively smaller groove angles with a first workpiece of said set having the largest groove angle and a last workpiece of said set having the smallest groove angle;
    a welding system for performing a welding operation to create a weld in said groove of each said workpiece using said consumable;
    a removal system for performing a standardized non-aggressive slag removal operation on said workpieces after said welding operation;
    means for measuring an amount of remaining slag for each said workpiece after performing said standardized non-aggressive slag removal operation;
    means for determining a minimum groove angle for which said amount of remaining slag is less than a threshold amount; and,
    means for rating said consumable according to said minimum groove angle.

* * * * *